(12) United States Patent
Neis et al.

(10) Patent No.: US 11,972,691 B2
(45) Date of Patent: Apr. 30, 2024

(54) AUTONOMOUS AERIAL VEHICLE FLIGHT MANAGEMENT

(71) Applicant: The Boeing Company, Chicago, IL (US)

(72) Inventors: Stefan Manuel Neis, Bensheim (DE); Sebastian Michael Sprengart, Darmstadt (DE); Robert Lowell Rosenau, Aurora, CO (US)

(73) Assignee: The Boeing Company, Chicago, IL (US)

( * ) Notice: Subject to any disclaimer, the term of this patent is extended or adjusted under 35 U.S.C. 154(b) by 179 days.

(21) Appl. No.: 17/452,205

(22) Filed: Oct. 25, 2021

(65) Prior Publication Data

US 2022/0130263 A1   Apr. 28, 2022

Related U.S. Application Data

(60) Provisional application No. 63/106,233, filed on Oct. 27, 2020.

(51) Int. Cl.
*G08G 5/00* (2006.01)
*B64D 43/00* (2006.01)
*G05D 1/00* (2006.01)

(52) U.S. Cl.
CPC ........... *G08G 5/0039* (2013.01); *B64D 43/00* (2013.01); *G05D 1/101* (2013.01)

(58) Field of Classification Search
CPC .. G08G 5/0039; G08G 5/0013; G08G 5/0026; G08G 5/0043; G08G 5/0052; G08G 5/0069; G08G 5/003; G08G 5/06; G08G 5/0034; B64D 43/00; G05D 1/101; G05D 1/104; B64C 19/00; B64C 13/18
See application file for complete search history.

(56) References Cited

U.S. PATENT DOCUMENTS

| | | | | |
|---|---|---|---|---|
| 7,809,405 B1* | 10/2010 | Rand | ................... | G08G 5/0013 455/431 |
| 9,824,593 B1* | 11/2017 | Kronfeld | ............... | G01S 13/953 |
| 9,847,034 B1* | 12/2017 | Plawecki | ............. | G08G 5/0039 |
| 2011/0035149 A1* | 2/2011 | McAndrew | ............ | G08G 5/006 701/466 |
| 2014/0343762 A1* | 11/2014 | Buratto | .................. | B64D 43/00 701/14 |

(Continued)

*Primary Examiner* — Abby Y Lin
*Assistant Examiner* — Dylan M Katz
(74) *Attorney, Agent, or Firm* — Yee & Associates, P.C.

(57) ABSTRACT

A method, apparatus, apparatus, and computer program product for managing an autonomous aerial vehicle. A copy of a mission plan is stored in a mission work queue. The mission plan is located in the autonomous aerial vehicle and comprises mission components that define tasks performed by the autonomous aerial vehicle. A change to the mission components in the copy of the mission plan in the mission work queue is received to form a modified mission component in the copy of the mission plan. A determination is made as to whether the copy of the mission plan including the modified mission component can be executed by the autonomous aerial vehicle. The copy of the mission plan including the modified mission component is synchronized with the mission plan in the autonomous aerial vehicle such that the mission plan includes the modified mission component. The autonomous aerial vehicle executes the mission plan.

36 Claims, 16 Drawing Sheets

(56) References Cited

U.S. PATENT DOCUMENTS

| | | | |
|---|---|---|---|
| 2016/0307447 A1* | 10/2016 | Johnson | H04B 7/18506 |
| 2017/0334559 A1* | 11/2017 | Bouffard | G08G 5/0034 |
| 2019/0235532 A1* | 8/2019 | Paduano | G06Q 50/265 |
| 2020/0058224 A1* | 2/2020 | Giona | G08G 5/0034 |
| 2020/0356115 A1* | 11/2020 | Kubie | G08G 1/096844 |
| 2021/0065561 A1 | 3/2021 | Sprengart | |

* cited by examiner

AUTONOMOUS AERIAL VEHICLE FLIGHT MANAGEMENT

RELATED PROVISIONAL APPLICATION

This application is related to and claims the benefit of priority of provisional U.S. Patent Application Ser. No. 63/106,233, entitled "AUTONOMOUS AERIAL VEHICLE FLIGHT MANAGEMENT", filed on Oct. 27, 2020, which is hereby incorporated by reference.

BACKGROUND INFORMATION

1. Field

The present disclosure relates generally to aircraft and, in particular, to operating autonomous aerial vehicles.

2. Background

Autonomous aerial vehicles can include drones and larger aircraft that can carry passengers and cargo. Different degrees of autonomy can be present in operating autonomous aerial vehicles. An autonomous aerial vehicle can execute a mission from an origination location to a destination location. This execution of the mission can be performed without requiring input from a human operator. Although an autonomous aerial vehicle does not require instructions or commands from a human operator while executing a mission, the human operator can provide input to change parameters of the mission being executed by the autonomous aerial vehicle. This input can make changes such as changing a destination location, an approach, or an altitude.

Currently, autonomous aerial vehicles are managed by human operators. The human operators can perform tasks relating to operation of the autonomous aerial vehicles that are required by government regulations. Some actions performed by an autonomous aerial vehicle require explicit input from a human operator for the autonomous aerial vehicle to perform those actions.

For example, a human operator managing an autonomous aerial vehicle can request a taxi route from an air traffic controller. Government regulations may require input for clearance. The workload from these and other tasks performed by a human operator can limit the number of autonomous aerial vehicles that can be managed by a human operator.

Therefore, it would be desirable to have a method and apparatus that take into account at least some of the issues discussed above, as well as other possible issues. For example, it would be desirable to have a method and apparatus that overcome a technical problem with managing missions for multiple autonomous aerial vehicles.

SUMMARY

An embodiment of the present disclosure provides an autonomous aircraft management system comprising a computer system and a mission manager in the computer system. The mission manager is configured to store a copy of a mission plan in a mission work queue, wherein the mission plan is located in an autonomous aerial vehicle and comprises mission components that define tasks performed by the autonomous aerial vehicle. The mission manager is configured to receive a change to the mission components in the copy of the mission plan in the mission work queue to form a modified mission component in the copy of the mission plan in the mission work queue. The vehicle manager is configured to determine that the copy of the mission plan including the modified mission component can be executed by the autonomous aerial vehicle. The vehicle manager is configured to synchronize the copy of the mission plan including the modified mission component with the mission plan in the autonomous aerial vehicle such that the mission plan includes the modified mission component.

Another embodiment of the present disclosure provides an autonomous aerial vehicle system comprising a computer system located in an autonomous aerial vehicle and a vehicle manager in the computer system. The vehicle manager is configured to execute a mission plan for the autonomous aerial vehicle, wherein the mission plan comprises mission components. The vehicle manager is configured to receive a modified mission component over a communications link. The vehicle manager is configured to determine that the modified mission component can be executed in a new mission plan that includes the mission components and the modified mission component. The vehicle manager is configured to execute the new mission plan.

Yet another embodiment of the present disclosure provides a method for managing an autonomous aerial vehicle. A copy of a mission plan is stored by a computer system in a mission work queue. The mission plan is located in the autonomous aerial vehicle and comprises mission components that define tasks performed by the autonomous aerial vehicle. A change to the mission components in the copy of the mission plan in the mission work queue is received by the computer system to form a modified mission component in the copy of the mission plan in the mission work queue. The computer system determines that the copy of the mission plan including the modified mission component can be executed by the autonomous aerial vehicle. The copy of the mission plan including the modified mission component is synchronize by the computer system with the mission plan in the autonomous aerial vehicle such that the mission plan includes the modified mission component. The autonomous aerial vehicle executes the mission plan including the modified mission component.

Still another embodiment of the present disclosure provides a computer program product for managing an autonomous aerial vehicle. The computer program product comprises a computer-readable storage media with first program code, second program code, third program code, and fourth program code stored on computer-readable-storage media. The first program code is executable by a computer system to cause the computer system to store a copy of a mission plan in a mission work queue, wherein the mission plan is located in an autonomous aerial vehicle and comprises mission components that define tasks performed by the autonomous aerial vehicle. The second program code is executable by the computer system to cause the computer system to receive a change to the mission components in the copy of the mission plan in the mission work queue to form a modified mission component in the copy of the mission plan in the mission work queue. The third program code is executable by the computer system to cause the computer system to determine that the copy of the mission plan including the modified mission component can be executed by the autonomous aerial vehicle. The fourth program code is executable by the computer system to cause the computer system to synchronize the copy of the mission plan including the modified mission component with the mission plan in the autonomous aerial vehicle such that the mission plan includes the modified mission component. The autonomous aerial vehicle executes the mission plan including the modified mission component.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
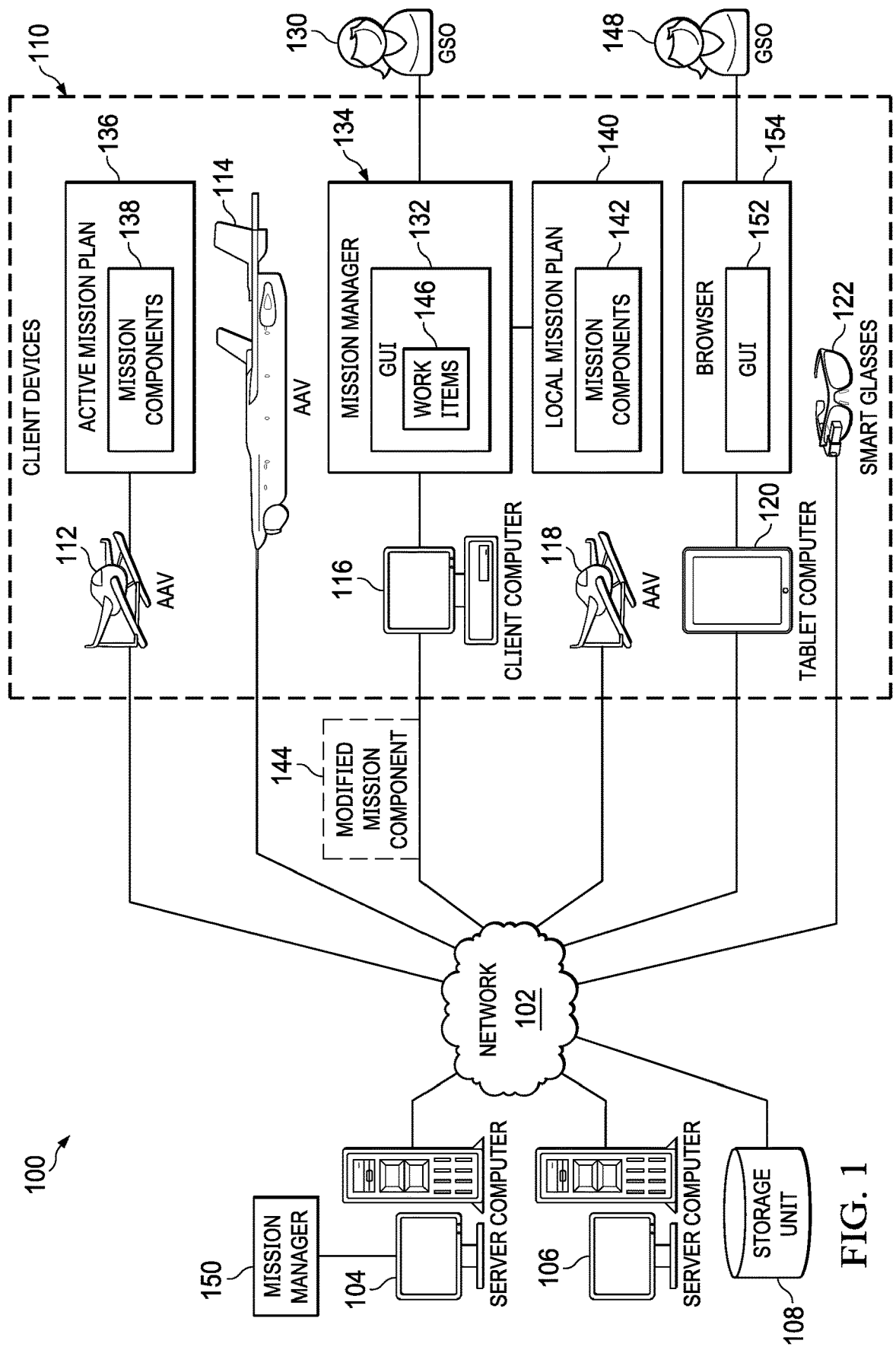
FIG. 1 is a pictorial representation of a network of data processing systems in which illustrative embodiments may be implemented.

The illustrative embodiments recognize and take into account one or more different considerations. The illustrative embodiments recognize and take into account that in addition to tasks that require actions by a human operator, various (e.g., unforeseeable) events may occur that cannot be handled by autonomous aerial vehicles. The illustrative embodiments recognize and take into account that the human operator needs to react to these types of events.

The illustrative embodiments recognize and take into account that ground stations are used by human operators to manage autonomous aerial vehicles. The illustrative embodiments recognize and take into account that each ground station for an autonomous aerial vehicle can mirror aircraft instruments and provide information needed by a human operator to monitor and perform actions with respect to managing the autonomous aerial vehicles. The illustrative embodiments recognize and take into account that this type of representation of information to a human operator can limit the number of autonomous aerial vehicles that the human operator can handle without an undesired workload.

Further, the illustrative embodiments also recognize and take into account that managing autonomous aerial vehicles currently require constant real-time communications links used to exchange and receive information between the ground station and the autonomous aerial vehicle.

The illustrative embodiments recognize and take into account that a reliable communications link may not always be available. Thus, the illustrative embodiments provide a method, apparatus, system, and computer program product for managing operation of autonomous aerial vehicles without relying on constant real-time data relating to the autonomous aerial vehicles. In one illustrative example, a mission plan is preset for an autonomous aerial vehicle such that a human operator can know what tasks are being performed by an autonomous aerial vehicle even when a communications link has been lost. In one illustrative example, a graphical user interface is provided to the human operator that does not rely on display flight deck instruments to monitor the progress of commands in the autonomous aerial vehicle. In the illustrative example, the display of information is provided in the manner that increases situational awareness for the human operator with respect to at least one of tasks that are to be performed by the human operator or tasks performed by the autonomous aerial vehicle.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Thus, the illustrative embodiments provide a method, apparatus, system, and computer program product for managing an autonomous aerial vehicle. In one illustrative example, a method manages an autonomous aerial vehicle. A copy of a mission plan is stored by a computer system in a mission work queue. The mission plan is located in the autonomous aerial vehicle and comprises mission components that define tasks performed by the autonomous aerial vehicle. A change to the mission components in the copy of the mission plan in the mission work queue is received by the computer system to form a modified mission component in the copy of the mission plan in the mission work queue. A determination is made by the computer system as to whether the copy of the mission plan including the modified mission component can be executed by the autonomous aerial vehicle. The copy of the mission plan including the modified mission component is synchronized by the computer system with the mission plan in the autonomous aerial vehicle such that the mission plan includes the modified mission component. The autonomous aerial vehicle executes the mission plan including the modified mission component.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include autonomous aerial vehicle (AAV) 112, autonomous aerial vehicle (AAV) 114, client computer 116, and autonomous aerial vehicle (AAV) 118. Client devices 110 can be, for example, computers, workstations, network computers, vehicles, aircraft, autonomous unmanned aerial vehicles, satellites, or other client devices that are capable of processing information. In the depicted example, server computer 104 provides information, such as boot files, operating system images, and applications to client devices 110. Further, client devices 110 can also include other types of client devices such as tablet computer 120 and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections. For example, autonomous aerial vehicle (AAV) 112, autonomous aerial vehicle (AAV) 114, and autonomous aerial vehicle (AAV) 118 can connect to network 102 using wireless connections when operating on the ground or in the air.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

In this illustrative example, ground station operator (GSO) 130 is a human operating client computer 116. In this illustrative example, ground station operator (GSO) 130 interacts with graphical user interface (GUI) 132 in mission manager 134 in client computer 116 to manage the operation of autonomous aerial vehicle (AAV) 112.

In this illustrative example, the information displayed in graphical user interface (GUI) 152 in browser 154 can be generated by mission manager 134 running on client computer 116. In this illustrative example, active mission plan 136 is located in autonomous aerial vehicle (AAV) 112. As depicted, active mission plan 136 comprises mission components 138 in chronological order. Mission components 138 can be executed by autonomous aerial vehicle (AAV) 112 to perform a mission.

In this illustrative example, mission components 138 in active mission plan 136 form a complete mission plan. In other words, active mission plan 136 includes all of the required operations to fly from the origination location to the destination location. For example, active mission plan 136 can be considered to be complete when this mission plan includes a planned and air traffic control cleared en-route section; an airport at which the aircraft can land at the end of the en-route plan; and a selected approach procedure and a runway to land at the airport.

As a result, autonomous aerial vehicle (AAV) 112 is capable of flying from an origination location to a destination location even in the event that communications with autonomous aerial vehicle (AAV) 112 are lost during operation of autonomous aerial vehicle (AAV) 112. In this manner, all of the operations to be performed by autonomous aerial vehicle (AAV) 112 are known at all times even if communications are lost with autonomous aerial vehicle (AAV) 112.

As depicted, local mission plan 140 is managed by mission manager 134. Local mission plan 140 is a copy of active mission plan 136 in this illustrative example. As depicted, mission components 142 are a copy of mission components 138 in active mission plan 136.

In this illustrative example, local mission plan 140 is displayed in graphical user interface (GUI) 132 by mission manager 134. Ground station operator (GSO) 130 can make updates or changes to active mission plan 136 in autonomous aerial vehicle (AAV) 112 using mission manager 134.

For example, although active mission plan 136 is a complete mission plan, active mission plan 136 comprises parameters for a taxi route, a landing runway, a takeoff runway, or other parameters that may be present but not approved by an air traffic controller (ATC). In other words, active mission plan 136 may include this information, but the information may not have been approved or verified by an air traffic controller.

As a result, ground station operator (GSO) 130 can make updates to mission components 138 in autonomous aerial vehicle (AAV) 112 as needed. For example, when a taxi route is received, e.g. from an air traffic controller (ATC), ground station operator (GSO) 130 can interact with graphical user interface (GUI) 132 in mission manager 134 to modify a mission component in mission components 142 to specify the taxi route that has been received. This taxi route may be different from the taxi route currently in mission components 138 in active mission plan 136. In this manner, modified mission component 144 is generated with the correct taxi route.

As depicted, mission manager 134 sends modified mission component 144 to autonomous aerial vehicle (AAV) 112 over network 102. Modified mission component 144 may replace a mission component in mission components 138 or may be an additional mission component in mission components 138.

In this illustrative example, autonomous aerial vehicle (AAV) 112 returns a response indicating that modified mission component 144 has been received. This confirmation can be used to ensure which mission components 142 have been synchronized with mission components 138. If a response from autonomous aerial vehicle (AAV) 112 indicating that modified mission component 144 is not received, then mission components 142 in local mission plan 140 are not updated with modified mission component 144.

Other updates can be made based on approvals or information received from an air traffic controller. As another example, weather may result in needing to select a new destination for landing as compared to the current destination in active mission plan 136. This change can be made in a similar fashion by changing a mission component in mission components 142 in local mission plan 140.

This type of update to active mission plan 136 does not require a continuous real-time communication between mission manager 134 and autonomous aerial vehicle (AAV) 112. For example, if modified mission component 144 is not received by autonomous aerial vehicle (AAV) 112, autonomous aerial vehicle (AAV) 112 can continue to operate using active mission plan 136 with the current mission components.

Further, mission manager 134 can also make various determinations as to whether the change to mission components 142 are valid and can be made prior to sending modified mission components to autonomous aerial vehicle (AAV) 112. These determinations can include, for example, verifications or consistency checks.

Figure 2:
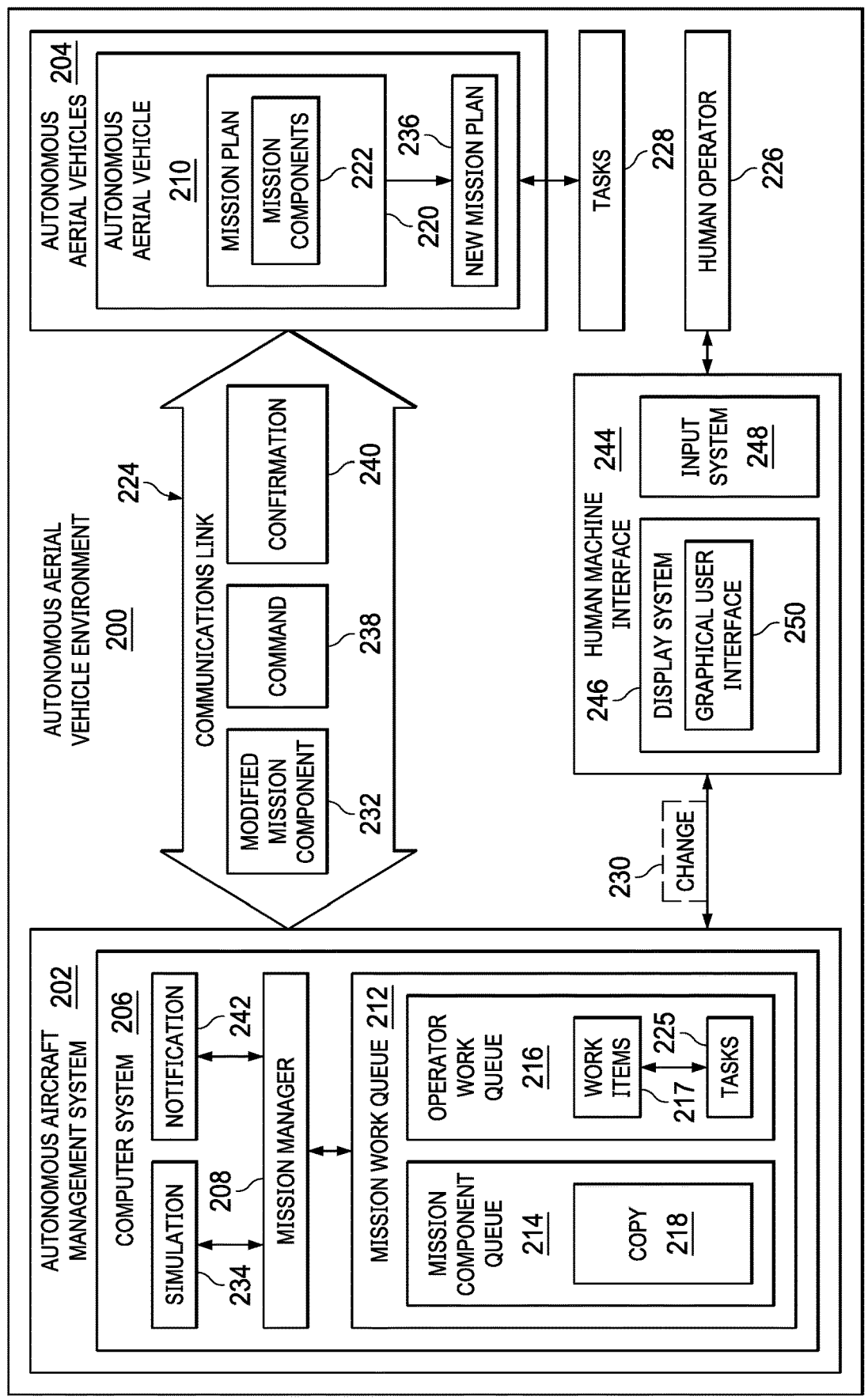
FIG. 2 is a block diagram of an autonomous aerial vehicle environment in accordance with an illustrative embodiment.

For example, mission manager 134 can perform simulation 234 in FIG. 2 of local mission plan 140 with modified mission component 144 to determine whether the change to a mission component in mission components 142 can be made. In this illustrative example, simulation 234 in FIG. 2 can be used to determine whether the modification to mission plan 220 in FIG. 2 can be performed with at least one of a desired level of safety, a desired level of performance, or a combination of the two.

In this illustrative example, simulation 234 in FIG. 2 can be performed using mission plan 220 in FIG. 2 with modified mission component 232 in FIG. 2 using the actual environment for autonomous aerial vehicle 210 in FIG. 2. This environment can include state information for autonomous aerial vehicle 210 in FIG. 2, environmental conditions around autonomous aerial vehicle 210 in FIG. 2, and other suitable information.

Simulation 234 in FIG. 2 can be performed considering various factors. These factors can include, for example, at least one of performance limits for autonomous aerial vehicle 210, whether particular tasks to be performed are legal under government regulations, a likelihood of the modified mission plan being approved by air traffic control (ATC), whether different mission components are continuously connected, or other considerations.

Simulation 234 in FIG. 2 can be performed, for example, to determine whether the current fuel on autonomous aerial vehicle (AAV) 112 is sufficient based on the required fuel when using modified mission component 144 in mission components 142 in local mission plan 140. If local mission plan 140 can be executed with modified mission component 144, then modified mission component 144 is sent to autonomous aerial vehicle (AAV) 112 over network 102.

In a similar fashion, autonomous aerial vehicle (AAV) 112 can perform its own checks to determine whether active mission plan 136 with modified mission component 144 can be executed. If active mission plan 136 can be executed, autonomous aerial vehicle (AAV) 112 updates active mission plan 136 with modified mission component 144 and executes active mission plan 136 in its updated form. If active mission plan 136 cannot be executed with modified mission component 144, then autonomous aerial vehicle (AAV) 112 continues executing active mission plan 136 without any changes.

In this illustrative example, the use of mission components for the mission plans can reduce issues caused by a loss of communications with autonomous aerial vehicle (AAV) 112. In this illustrative example, mission manager 134 operates to manage autonomous aerial vehicle (AAV) 112 without relying on continuous real-time communications.

As a further safety feature, a command to execute active mission plan 136 with modified mission component 144 can be sent to autonomous aerial vehicle (AAV) 112 when a response is received to command autonomous aerial vehicle (AAV) 112 to execute active mission plan 136 using modified mission component 144. Further, a response can be received from autonomous aerial vehicle (AAV) 112 to confirm that active mission plan 136 is being executed using modified mission component 144.

Additionally, mission manager 134 can reduce the workload for ground station operator (GSO) 130 in a manner that can increase the number of autonomous aerial vehicles that can be managed by ground station operator (GSO) 130. For example, mission manager 134 can display work items 146 in graphical user interface (GUI) 132. Work items 146 are in chronological order and represent tasks that are to be performed by ground station operator (GSO) 130. These tasks may include, for example, enter the taxi-out route, check whether the runway is clear, enter a departure route, change communications frequency, or other suitable tasks.

In this illustrative example, work items 146 can be displayed in graphical user interface (GUI) 132 in a manner that indicates when particular work items should be performed by ground station operator (GSO) 130. For example, work items 146 can be displayed along a timeline to indicate when work items 146 should be performed. Work items 146 can also include graphical information indicating the duration of tasks for work items 146.

In this manner, ground station operator (GSO) 130 can manage multiple autonomous aerial vehicles with a lower workload as compared to current systems that duplicate instrumentation on autonomous aerial vehicles. For example, ground station operator (GSO) 130 can also manage at least one of autonomous aerial vehicle (AAV) 114 or autonomous aerial vehicle (AAV) 118 in addition to autonomous aerial vehicle (AAV) 112 using mission manager 134. Further, the modifying and synchronizing of mission components with autonomous aerial vehicle (AAV) 112 reduces or eliminates a need for constant real-time communications with autonomous aerial vehicle (AAV) 112. This type of communication is unnecessary in the illustrative examples.

In another illustrative example, ground station operator 148 can operate tablet computer 120 to manage the operation of autonomous aerial vehicle (AAV) 118. In this example, mission manager 150 is located in server computer 104 and displays graphical user interface 152 in browser 154 on tablet computer 120.

With reference now to FIG. 2, a block diagram of an autonomous aerial vehicle environment is depicted in accordance with an illustrative embodiment. In this illustrative example, autonomous aerial vehicle environment 200 includes components that can be implemented in hardware such as the hardware shown in network data processing system 100 in FIG. 1.

In this illustrative example, autonomous aircraft management system 202 can operate to manage the operation of aircraft such as autonomous aerial vehicles 204. Autonomous aerial vehicles 204 can operate without pilots or human operators on board. In other words, autonomous aerial vehicles 204 are capable of flying from an origination location to a destination location without needing input from a pilot.

Autonomous aerial vehicles 204 can take a number of different forms. For example, autonomous aerial vehicles 204 can be selected from at least one of a passenger aerial vehicle (PAV), a vertical takeoff and landing vehicle, a rotorcraft, a drone, or some other suitable form.

In this illustrative example, autonomous aircraft management system 202 comprises a number of different components. As depicted, autonomous aircraft management system 202 comprises computer system 206 and mission manager 208. Mission manager 208 is located in computer system 206.

Mission manager 208 can be implemented in software, hardware, firmware, or a combination thereof. When software is used, the operations performed by mission manager 208 can be implemented in program code configured to run on hardware, such as a processor unit. When firmware is used, the operations performed by mission manager 208 can be implemented in program code and data and stored in persistent memory to run on a processor unit. When hardware is employed, the hardware can include circuits that operate to perform the operations in mission manager 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

In one illustrative example, mission manager 208 can operate to store information for managing operation of autonomous aerial vehicle 210 in autonomous aerial vehicles 204 in mission work queue 212. Mission work queue 212 can include queues such as mission component queue 214 and operator work queue 216.

As depicted, mission manager 208 can store copy 218 of mission plan 220 in mission component queue 214 in mission work queue 212.

As depicted, mission plan 220 is located in autonomous aerial vehicle 210 and comprises mission components 222. A mission component is one or more tasks performed by autonomous aerial vehicle 210 during operation of autonomous aerial vehicle 210. Mission components 222 are arranged in a sequential order based on when tasks 228 for mission components 222 are to be performed. In the illustrative example, the sequential order is a chronological order for autonomous aerial vehicle 210 to execute mission components 222 for mission plan 220.

In the illustrative example, mission plan 220 can contain zero to n number of mission components 222 at any given time. Zero mission components can be present if the mission has been completed. Each autonomous aerial vehicle can have a mission component queue.

The order of mission components 222 can be based on flight phases for autonomous aerial vehicle 210. In one example, a mission component such as taxi-out can include a sequence of waypoints for the taxi route.

In this illustrative example, mission plan 220 is uploaded to autonomous aerial vehicle 210 over communications link 224 prior to execution of mission plan 220 by autonomous aerial vehicle 210. As a result, autonomous aerial vehicle 210 can execute mission plan 220 in its current form to travel from the origination location to the destination location.

In this illustrative example, communications link 224 can take a number of different forms. For example, communications link 224 can be implemented using at least one of a satellite link, an encrypted satellite link, a radiofrequency communications link, or other suitable types of wireless communications links.

Thus, both mission manager 208 and autonomous aerial vehicle 210 can rely on autonomous aerial vehicle 210 having a complete mission plan. Mission plan 220 is a complete mission plan when mission plan 220 has sufficient information in mission components 222 to provide for a desired level of safety in operating autonomous aerial vehicle 210.

In other words, autonomous aerial vehicle 210 does not need user input or additional information to travel from an origination location to a destination location. For example, mission components 222 in mission plan 220 may provide information needed for autonomous aerial vehicle 210 to travel from a gate at an origination airport to a gate at a destination airport.

For example, if communications link 224 is lost, autonomous aerial vehicle 210 can still operate without user input from human operator 226. A communications link can be considered to be lost if information or data cannot be transmitted to autonomous aerial vehicle 210. Communications link 224 can also be considered to be lost if, for example, errors and/or latency in information transmission is greater than desired. For example, an error level in transmitting information may make it impractical to obtain information needed to fly autonomous aerial vehicle 210 in response to different events. In the illustrative example, an event in the events is one of turbulence, adverse weather conditions along a flight path, a lightning strike, a restricted airspace change, and a change in wind direction.

As depicted, mission components 222 define tasks 228 performed by autonomous aerial vehicle 210. Each mission component in mission components 222 can include one or more of tasks 228. In the illustrative example, mission components 222 are selected from at least one of a preflight, a taxi-out, a line up, a takeoff, a departure, an en-route cruise, an arrival, a landing, a taxi-in, a shutdown, or some other suitable type of mission component.

As depicted, operator work queue 216 contains work items 217. In this illustrative example, work items 217 comprise tasks 225 that are to be performed by human operator 226. Tasks 225 can be performed by human operator 226 during an autonomous aerial vehicle mission for autonomous aerial vehicle 210. Non-limiting examples of work items 217 can be at least one of perform a preflight checklist, enter a taxi-out route, check runway clear, initiate a takeoff, enter a departure route, file an initial flight plan, update a flight plan, change a frequency, contact a destination, enter an arrival route, initiate a landing, enter a taxi-in route, perform a post-flight checklist, or some other suitable task performed by human operator 226.

Work items 217 in operator work queue 216 are in a sequential order and, in this example, are ordered in the chronological order for performance by human operator 226 to support a mission for autonomous aerial vehicle 210. In this example, zero or more work items 217 can be in operator work queue 216.

Work items 217 in operator work queue 216 are for autonomous aerial vehicle 210. Each autonomous aerial vehicle can have a work queue.

In this example, a work item in work items 217 may or may not reference a work item in work items 217. Further, multiple work items in work items 217 can reference a mission component. In this example, mission plan 220 can have a one-to-one relationship with operator work queue 216 for a given autonomous aerial vehicle.

Mission manager 208 can receive change 230 to mission components 222 in copy 218 of mission plan 220 in mission component queue 214 in mission work queue 212. As depicted, change 230 can be to one or more of mission components 222 in copy 218.

In this illustrative example, change 230 in one or more of mission components 222 can be received from human operator 226 using human machine interface (HMI) 244. Human machine interface 244 comprises display system 246 and input system 248. Display system 246 is a physical hardware system and includes one or more display devices on which graphical user interface 250 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Human operator 226 is a person that can interact with graphical user interface 250 through user input 252 generated by input system 248 for computer system 206. Input system 248 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, change 230 can be received by mission manager 208 in user input 252 generated by human operator 226 using human machine interface 244. Human operator 226 can generate change 230 while performing a work item in work items 217 to manage autonomous aerial vehicle 210.

In this illustrative example, change 230 can modify mission components 222 in a number of different ways. For example, change 230 can modify one of mission components 222. In another illustrative example, change 230 can add a new mission component to mission components 222. In this illustrative example, mission components 222 with change 230 form modified mission component 232 in copy 218 of mission plan 220 in mission component queue 214 in mission work queue 212.

Additionally, mission manager 208 can determine whether copy 218 of mission plan 220 including modified mission component 232 can be executed by autonomous aerial vehicle 210. For example, mission manager 208 can perform simulation 234 using copy 218 of mission plan 220 with modified mission component 232 before sending modified mission component 232 to autonomous aerial vehicle 210. Simulation 234 can indicate that a particular change in speed may not provide a desired fuel efficiency or a sufficient amount of reserve fuel to reach a destination airport.

A determination cannot be made using other mechanisms other than simulation 234. For example, modified mission component 232 may be a change in destination airports. The determination can be made using consistency checks using mechanisms other than simulation 234. In one illustrative example, a consistency check can be a process that evaluates and ensures that all mission components in a mission plan meet the required dependency conditions, between and across components, for a feasible mission plan that can be executed to perform a mission.

Consistency checks can be performed to determine whether conflicting components are present in a mission plan. The consistency checks can be performed using simulation 234, a policy containing rules that define when elements for a mission plan are considered to be consistent with each other, or other suitable mechanisms.

For example, changing a target airport without changing the approach to the target airport can result in a conflict between the approach and the target airport in the mission plan in which the mission plan fails the consistency check. As another example, a modified mission component with a selection of a different runway to land at than the runway matching the selected arrival procedure in the mission plan can result in the mission plan with the modified mission component failing to pass the consistency check. A mission plan that ends at a different airport than the airport defined as the destination airport can also result in the mission plan failing to pass the consistency check. As yet another example, a mission plan with a taxiway that ends at a different runway than the runway specified for departure can also cause the mission plan to fail the consistency check.

A consistency check can be performed using a policy comprising a set of rules to determine whether mission components 222 such as determining whether an approach to an airport is for the correct airport when a destination airport is changed.

In this illustrative example, simulation 234 can simulate the flight of autonomous aerial vehicle 210 using current state and performance information from autonomous aerial vehicle 210, environmental information, and other suitable information. Mission manager 208 can determine whether copy 218 of mission plan 220 including modified mission component 232 can be executed using consistency checks and indicate when an error is present when copy 218 of mission plan 220 including modified mission component 232 cannot be executed by autonomous aerial vehicle 210. In this illustrative example, the current state and performance information can include, for example, amount of fuel remaining, fuel usage, velocity, altitude, weather conditions, and other suitable information. The simulation can be used to determine whether using modified mission component 232 with mission components 222 can result in autonomous aerial vehicle 210 operating with a desired level of safety. The simulation can also determine whether autonomous aerial vehicle 210 can maintain performance parameters such as desired arrival time, fuel usage, passenger comfort, or other parameters.

In this illustrative example, mission manager 208 can synchronize copy 218 of mission plan 220 including modified mission component 232 with mission plan 220 in autonomous aerial vehicle 210 such that mission plan 220 includes modified mission component 232.

The synchronizing can occur in a number of different ways. For example, mission manager 208 can send modified mission component 232 to autonomous aerial vehicle 210 over communications link 224 to form new mission plan 236 located in autonomous aerial vehicle 210. Additionally, mission manager 208 can send command 238 to autonomous aerial vehicle 210 to execute new mission plan 236 when autonomous aerial vehicle 210 returns confirmation 240 that new mission plan 236 has been received by autonomous aerial vehicle 210.

In another illustrative example, in synchronizing copy 218, mission manager 208 can send modified mission component 232 to autonomous aerial vehicle 210 over communications link 224 to form new mission plan 236 located in autonomous aerial vehicle 210. Mission manager 208 can send command 238 to autonomous aerial vehicle 210 to execute new mission plan 236 when autonomous aerial vehicle 210 returns confirmation 240 that new mission plan 236 can be executed by autonomous aerial vehicle 210.

In still another illustrative example, mission manager 208 can send modified mission component 232 to autonomous aerial vehicle 210 over communications link 224 to form new mission plan 236 located in autonomous aerial vehicle 210. Mission manager 208 can receive confirmation 240 that new mission plan 236 has been received by autonomous aerial vehicle 210 as part of the synchronization process.

In yet another illustrative example of synchronizing copy 218, mission manager 208 can send modified mission component 232 to autonomous aerial vehicle 210 over communications link 224 to form new mission plan 236 located in autonomous aerial vehicle 210. Mission manager 208 can generate notification 242 indicating that modified mission component 232 has not been received. This notification can be generated when confirmation 240 that new mission plan 236 has been received by autonomous aerial vehicle 210 is not received within a period of time for a timeout.

Figure 3:
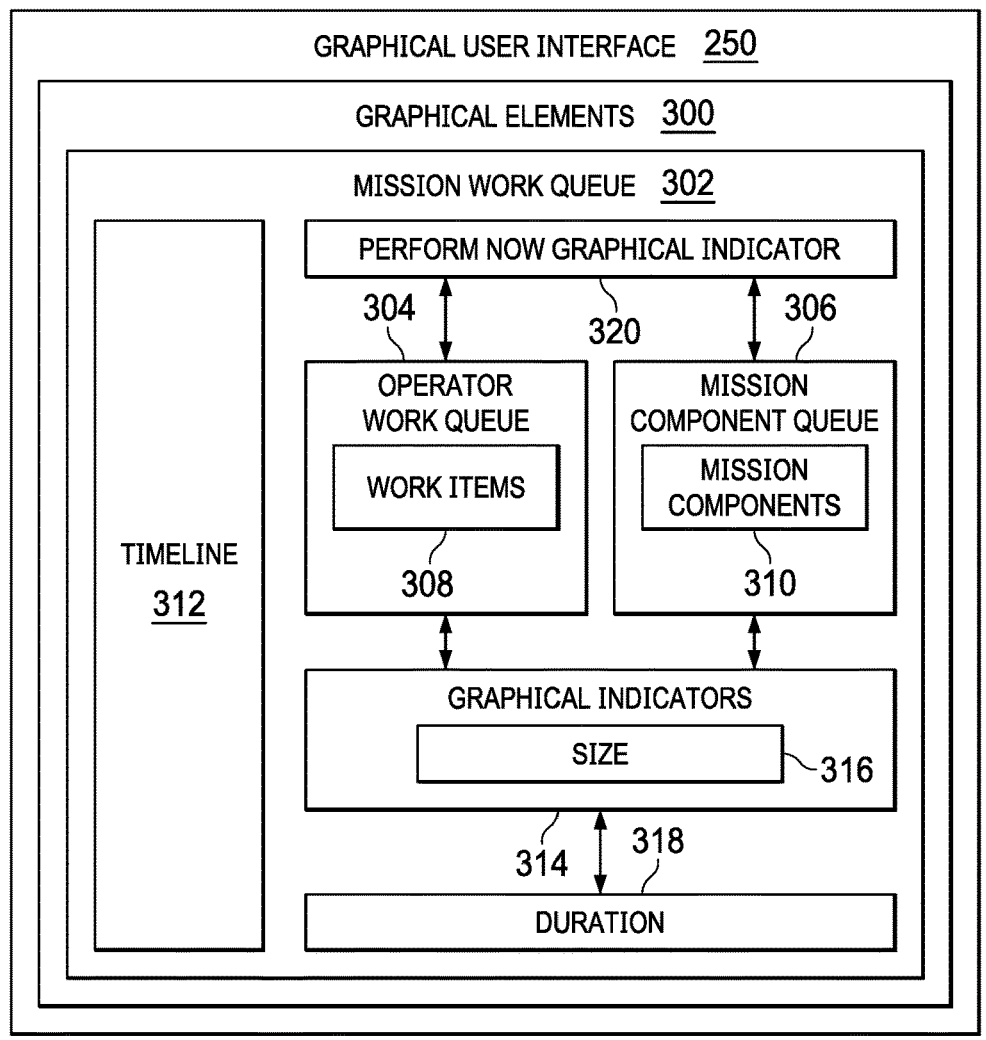
FIG. 3 is an illustration of a graphical user interface for displaying information for managing an unmanned aerial vehicle using a human machine interface in accordance with an illustrative embodiment.

Turning next to FIG. 3, an illustration of a graphical user interface for displaying information for managing an unmanned aerial vehicle using a human machine interface is depicted in accordance with an illustrative embodiment. In the illustrative examples, the same reference numeral may be used in more than one figure. This reuse of a reference numeral in different figures represents the same element in the different figures.

In this illustrative example, an example of graphical elements 300 that can be displayed in graphical user interface 250 to manage the operation of autonomous aerial vehicle 210 is shown. In this example, human machine interface 244 in FIG. 2 is configured to operate under the command of mission manager 208 in FIG. 2 to display graphical user interface 250 in display system 246 in FIG. 2.

As depicted, mission work queue 302 is displayed in graphical user interface 250. As depicted, operator work queue 304 and mission component queue 306 are displayed in mission work queue 302 in graphical user interface 250. These different graphical elements are graphical elements 300 that visually represent data and data structures such as mission work queue 212, mission component queue 214, and operator work queue 216 in FIG. 2.

In this illustrative example, work items 308 are displayed in a sequential order in operator work queue 304 relative to timeline 312. Mission components 310 are also displayed in a sequential order in mission work queue 302 relative to timeline 312. In other words, work items 308 and mission components 310 are displayed in an order in which these items should be performed.

In this illustrative example, timeline 312 provides an indication of time for performing these different items. Further, work items 308 and mission components 310 can be displayed in parallel to each other relative to timeline 312. In this manner, human operator 226 in FIG. 2 can see when work items 308 are performed relative to when mission components 310 are executed.

Further, work items 308 and mission components 310 can be displayed using graphical indicators 314 that have size 316 representing duration 318. For example, size 316 can be a vertical size when timeline 312 extends vertically in graphical user interface 250. In another example, size 316 can be a horizontal size when timeline 312 extends horizontally in graphical user interface 250.

For example, when an item is represented by a shape such as a rectangle in graphical user interface 250 when timeline 312 extends vertically in graphical user interface 250, the top edge of the rectangle indicates a start time. The bottom edge of the rectangle indicates a finish time.

In this illustrative example, these items are aligned to timeline 312 based on a start time at which each of these items should be performed or executed. In the depicted example, the start time can be the earliest start time when a set of tasks for an item can be started. The finish time can be the latest finish time of when the set of tasks for the item can be completed.

In this illustrative example, duration 318 can be estimated from the relative vertical size of different items in work items 308 and mission components 310 to each other. Further, an estimate of duration 318 can be determined based on comparing size 316 of work items 308 and mission components 310 to timeline 312. In this example, timeline 312 can be scaled to provide an indication of a time that can be used to estimate duration 318.

In this illustrative example, perform now graphical indicator 320 is a graphical element in graphical elements 300 that can be used to indicate when it is time to perform work items 308 and mission components 310. In this illustrative example, work items 308 and mission components 310 can move relative to perform now graphical indicator 320. In this illustrative example, perform now graphical indicator 320 takes the form of a line. In other illustrative examples, perform now graphical indicator 320 can be also be at least one of a change in color indicating an item that is to be performed now, text, an animation, or other types of graphical indicators that can be used to indicate that a particular item such as a work item should be performed now or a mission component is being executed now.

As depicted, graphical elements 300 for mission work queue 302 displayed in graphical user interface 250 can be used to manage an autonomous aerial vehicle. This type of display is used in place of instrumentation displays currently employed for managing autonomous aerial vehicles. With this type of display, a human operator can more easily determine when and what work items need to be performed from viewing work items 308 displayed in a sequential order relative to timeline 312. Further, with the display of mission components 310 in a sequential order relative to timeline 312, the human operator can more easily determine when different tasks being executed by autonomous aerial vehicle may require attention.

This determination can be made by viewing work items 308 that may be displayed relative to mission components 310 in which work items 308 can indicate tasks that may need to be performed with respect to corresponding mission components. Work items 308 can also include other tasks that are to be performed that may not be related to mission components 310.

With the use of graphical elements 300 for mission work queue 302, a human operator can manage multiple autonomous aerial vehicles. Management of the multiple autonomous aerial vehicles can be performed more easily with a lower workload as compared to using currently displayed instrumentation for autonomous aerial vehicles.

Figure 4:
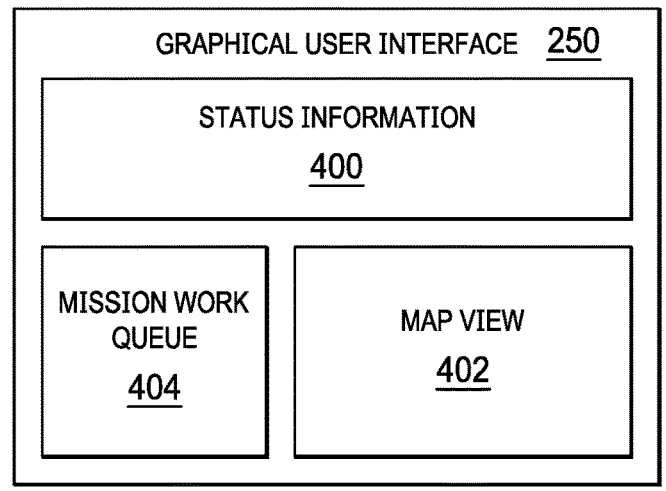
FIG. 4 is an illustration of a graphical user interface for use by a human operator at a ground station in accordance with an illustrative embodiment.
Figure 5:
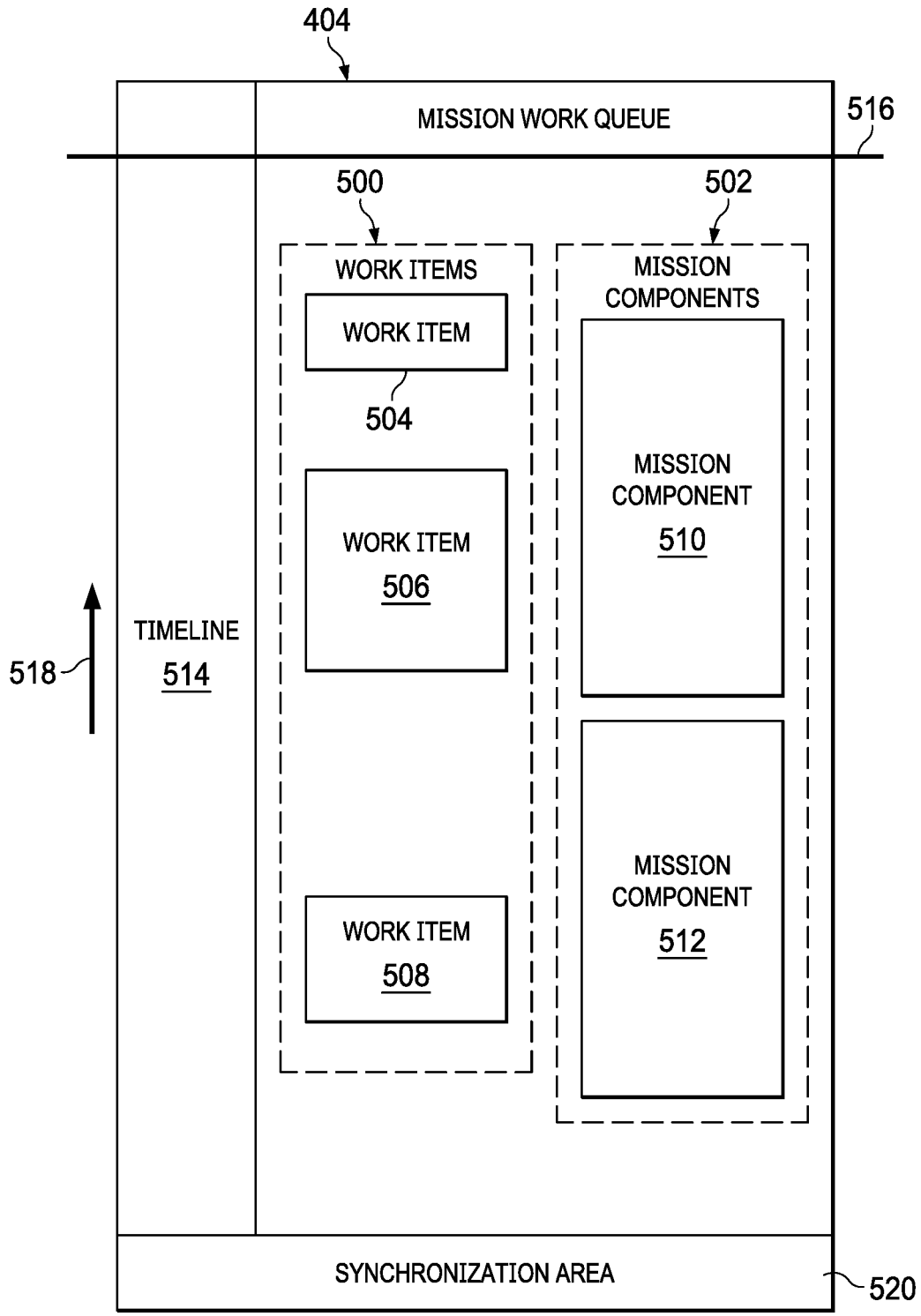
FIG. 5 is an illustration of a mission work queue in FIG. 4 in accordance with an illustrative embodiment.

FIG. 4 and FIG. 5 are an example of another implementation for graphical user interface 250 in FIGS. 2-3. With graphical user interface 250 in FIG. 4 and FIG. 5, multiple autonomous aerial vehicles can be monitored, commanded, and managed at the same time by one or more human operators at one or more ground stations.

With reference first to FIG. 4, an illustration of a graphical user interface for use by a human operator at a ground station is depicted in accordance with an illustrative embodiment. In this depicted example, graphical user interface 250 comprises status information 400, map view 402, and mission work queue 404.

In this illustrative example, status information 400 is an area of graphical user interface 250 in which status information 400 for an autonomous aerial vehicle can be displayed to a human operator. For example, status information 400 can include information about an autonomous aerial vehicle and a mission plan. For example, this information can include a flight phase, an estimated arrival time, or other suitable information.

Map view 402 is an area in which information about the environment around the autonomous aerial vehicle can be displayed. For example, map view 402 can include information such as an aircraft symbol, a cultural map, an attitude, a speed, an altitude, a direction, a route, weather, a notice to airmen (NOTAM), airport information, and other suitable information.

In this illustrative example, mission work queue 404 is an example of mission work queue 212 in FIG. 2 and mission work queue 302 in FIG. 3. In this example, mission work queue 404 is an area that includes information used by a human operator to manage an autonomous aerial vehicle. In this example, mission work queue 404 is displayed for a single autonomous aerial vehicle at any particular time. This type of display can avoid confusion or mistaken commands being sent to the wrong autonomous aerial vehicle.

Turning next to FIG. 5, an illustration of a mission work queue in FIG. 4 is depicted in accordance with an illustrative embodiment. An example of one implementation for mission work queue 404 in FIG. 4 is shown in this figure.

As depicted, work items 500 and mission components 502 are displayed parallel to each other in mission work queue 404. Although not graphically shown in this example, work items 500 are part of an operator work queue, and mission components 502 are part of a mission component queue.

Work items 500 include work item 504, work item 506, and work item 508 in this example. Mission components 502 include mission component 510 and mission component 512 in this depicted example. Additional work items and mission components can be present but not yet displayed in mission work queue 404. In this example, these components can be scrolled or dragged to display other work items and mission components that may be performed at a future time for the mission plan.

Work items 500 and mission components 502 are displayed sequentially in a chronological order relative to timeline 514. Timeline 514 can include periodic increments. For example, timeline 514 can include five minutes, ten minutes, or some other increment of time.

As can be seen in this illustrative example, work items 500 and mission components 502 are aligned relative to timeline 514 based on their expected start times. Further, the vertical size of work items 500 and mission components 502 indicate the duration that is calculated or expected for these components.

In this illustrative example, work items 500 and mission components 502 can be linked to each other, but may be performed at different times and do not necessarily have to be performed together. In other words, a work item may be linked to a mission component because the work item is to be performed for the mission component. For example, work item 504 may request input of a taxi-out route by a human operator before a taxi-out in mission component 510 can be executed by the autonomous aerial vehicle.

As depicted, perform now line 516 is a graphical indicator that indicates the current time on timeline 514. Perform now line 516 can graphically indicate when work items 500 and mission components 502 should be performed. In this illustrative example, work items 500 and mission components 502 move in the direction of arrow 518 relative to perform now line 516, which is fixed in this example.

In this illustrative example, synchronization area 520 indicates when synchronization is needed between a local copy of the mission plan in the illustrative plan located in the autonomous aerial vehicle. In this illustrative example, synchronization area 520 can graphically indicate when synchronization is needed.

For example, synchronization can be needed after a mission component has been modified and the modified mission component has been checked to determine that the machine component can be executed. The graphical indication for synchronization can be, for example, displaying a color, an animation, flashing text, or other suitable graphical indicators. Synchronization area 520 can be selected when synchronization should be performed. Synchronization area 520 can also display information such as an identification of one or more modified mission components that should be synchronized.

Figure 6:
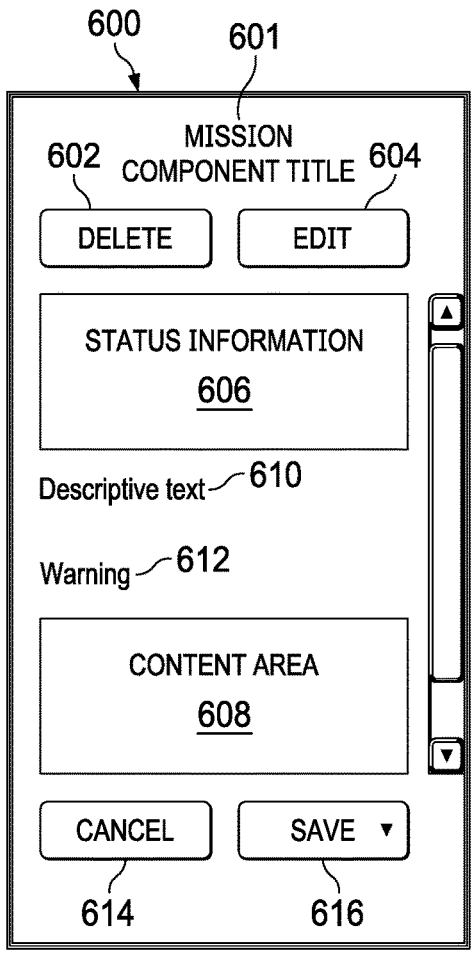
FIG. 6 is an illustration of an editing window in accordance with an illustrative embodiment.

With reference next to FIG. 6, an illustration of an editing window is depicted in accordance with an illustrative embodiment. In this example, editing window 600 is an example of a window that can be displayed in a graphical user interface in response to a selection of a mission component for editing.

In this example, when a mission component is selected, editing window 600 is displayed with mission component title 601 to identify which mission component has been selected for editing. As depicted, editing window 600 displays delete 602 and edit 604, enabling a human operator to delete or edit the particular mission component that has been selected.

In this illustrative example, status information 606 is an area in which status information is displayed about the selected mission component. Status information 606 can include a duration, an execution status, or other suitable information about the mission component.

As depicted, content area 608 is displayed and includes content that can be reviewed and edited by the human operator. Descriptive text 610 is an area in editing window 600 that provides information to the human operator about content area 608. Descriptive text 610 can include information such as what input is needed, what changes can be made, or other suitable instructions.

As depicted, warning 612 can be displayed or graphically highlighted if incorrect user input has been entered by the human operator. The human operator can choose cancel 614 to cancel changes or save 616 to save the changes made to the mission component in editing window 600.

Figure 7:
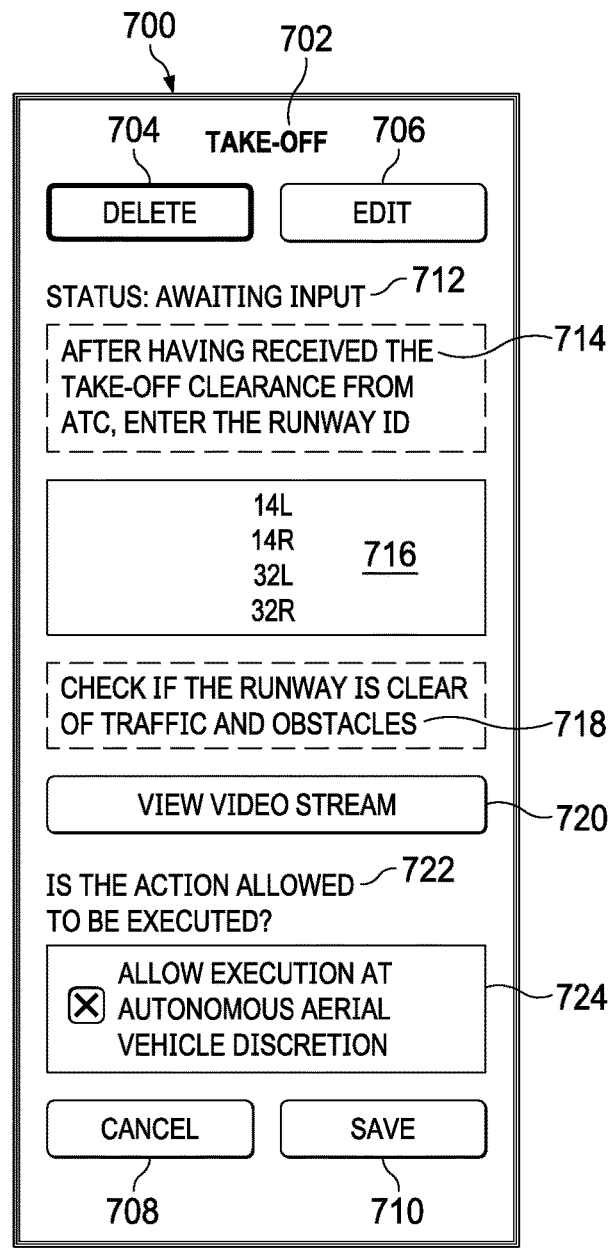
FIG. 7 is an example of an editing window for a takeoff mission component in accordance with an illustrative embodiment.

Turning now to FIG. 7, an example of an editing window for a takeoff mission component is depicted in accordance with an illustrative embodiment. In this illustrative example, editing window 700 is an example of one implementation for editing window 600 shown generally in FIG. 6.

As depicted, editing window 700 displays "take-off" as mission component title 702 for the mission component selected for editing. As shown in this figure, editing window 700 includes controls such as delete 704, edit 706, cancel 708, and save 710.

In this example, status information 712 is "awaiting input". In other words, this mission component requires input from a human operator.

In this depicted example, descriptive text 714 comprises instructions for content area 716: "after having received the takeoff clearance from ATC, enter the runway ID". Content area 716 provides a list of runway IDs that can be selected by the human operator.

As depicted, descriptive text 718 for content 720 provides instructions to the human operator to "check if the runway is clear of traffic and obstacles". In this example, content 720 is a control to view a video stream from the autonomous aerial vehicle. Selection of content 720 causes a video stream generated by a camera system on the autonomous aerial vehicle to be displayed to the human operator.

Descriptive text 722 is "is the action allowed to be executed?" Descriptive text 722 requests a user input to content 724. In this depicted example, content 724 includes a checkbox to receive user input indicating that the takeoff can be performed at the discretion of the autonomous aerial vehicle.

As can be seen in this illustrative example, the content in an editing window can take many forms. For example, the content in the editing window can request a selection or entry information. As another example, the content in the editing window can provide information such as a video stream from the autonomous aerial vehicle.

In this illustrative example, user input can be made to select save 710 after a runway ID has been entered and the human operator has determined that the runway is clear of traffic and obstacles. If the human operator determines that the runway is not clear of traffic and obstacles, the human operator can select cancel 708 or wait until the runway is clear of traffic and obstacles to select save 710.

The illustration of editing window 600 in FIG. 6 and editing window 700 in FIG. 7 are provided as one manner in which changes can be made to a mission component, and are not meant to limit the manner in which other illustrative examples can be implemented. For example, multiple content and descriptive text areas can be displayed in addition to content area 608 and descriptive text 610. Additional areas can be displayed to simplify or reduce workload and modify a mission component.

Figure 8:
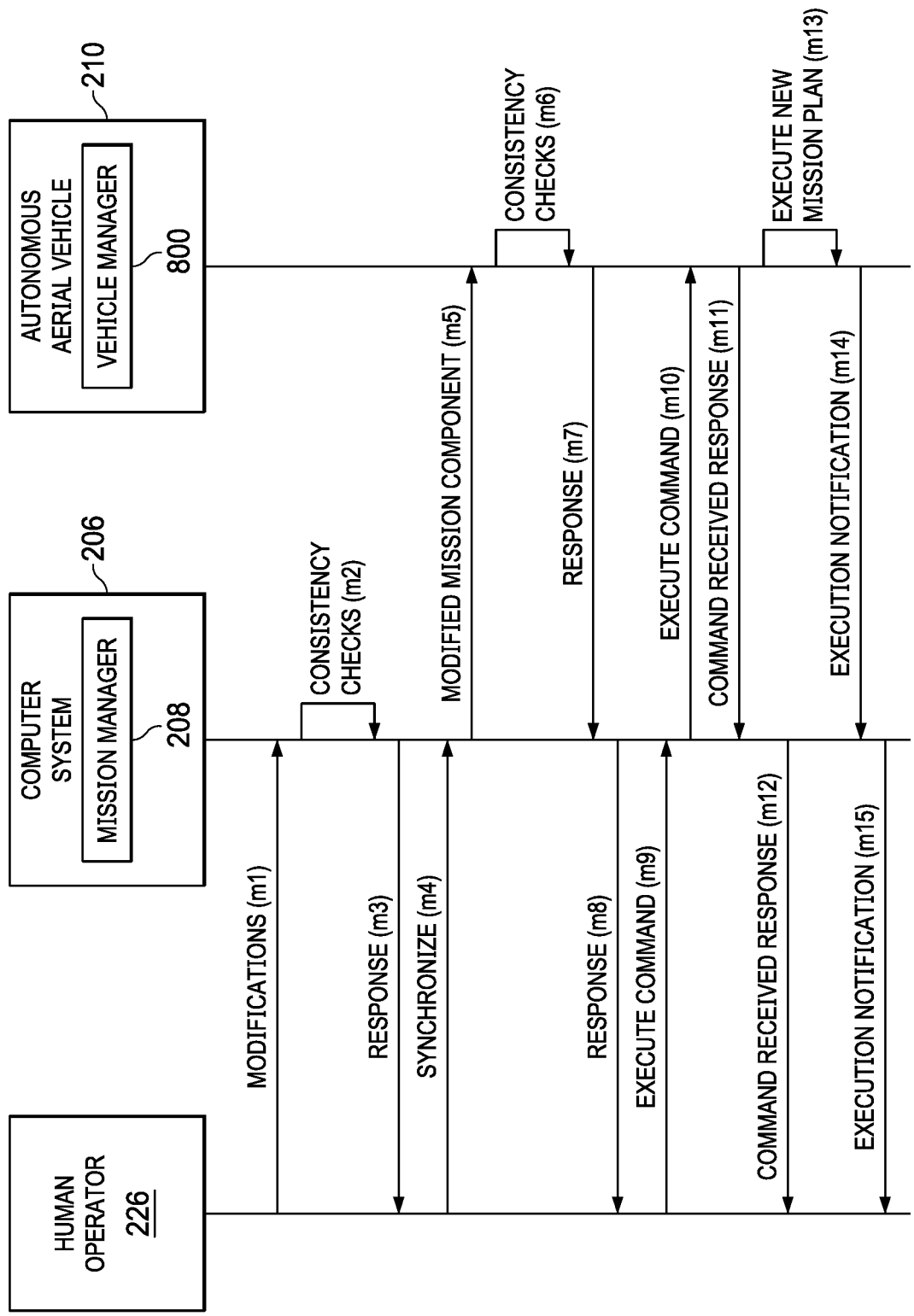
FIG. 8 is an illustration of a message flow diagram for modifying a mission plan for an autonomous aerial vehicle in accordance with an illustrative embodiment.

With reference next to FIG. 8, an illustration of a message flow diagram for modifying a mission plan for an autonomous aerial vehicle is depicted in accordance with an illustrative embodiment. In this illustrative example, the message flow diagram includes a flow of messaging and steps that are used to update a mission plan in vehicle manager 800. In this example, vehicle manager 800 is a computer system in autonomous aerial vehicle 210. Vehicle manager 800 can be, for example, at least one of an autopilot, an autonomous flight controller, an autonomous flight management system, or some other suitable system for controlling operation of autonomous aerial vehicle 210.

This message flow for updating a mission plan can increase safety by implementing multiple checks that can be performed by human operator 226, mission manager 208 in computer system 206, and vehicle manager 800 in autonomous aerial vehicle 210.

In the illustrative example, the interactions between human operator 226 and computer system 206 in this message flow diagram uses a human machine interface such as human machine interface 244 in FIG. 2. Human machine interface 244 can be used to display messages sent to human operator 226 and to generate user input such as messages or modifications to mission components. The exchange of the messages between mission manager 208 and vehicle manager 800 are made using one or more wireless communications links.

In this illustrative example, human operator 226 makes modifications to a mission component in the local mission plan in computer system 206 (message m1).

Mission manager 208 performs consistency checks to determine whether the local mission plan with the modified mission component can be executed by autonomous aerial vehicle 210 (step m2). In step m2, the consistency checks can be run based on performance and environment data for autonomous aerial vehicle 210. In this illustrative example, a local copy of vehicle manager 800 in autonomous aerial vehicle 210 can be run by mission manager 208 on computer system 206 to execute the local mission plan in a manner that takes actual performance and the environment into account when simulating the mission plan. The actual performance and environmental data can be obtained from autonomous aerial vehicle 210, sensor systems in autonomous aerial vehicle 210, and other sensor systems.

The execution of the local mission plan can be performed to determine whether the mission plan with the modified mission component is consistent, complete, and executable in accordance with safety requirements. The safety requirements can also include margins for operating autonomous aerial vehicle 210. For example, a margin can be fuel required versus the fuel onboard autonomous aerial vehicle 210. Additional fuel may be required as a margin to meet a safety requirement for operating autonomous aerial vehicle 210. These consistency checks could also be performed during the creation of a mission plan for autonomous aerial vehicle 210.

If the consistency checks indicate that the local mission plan with the modified mission components can be executed, a response is returned to human operator 226 by mission manager 208, indicating that the modified local mission plan with the modified mission component can be synchronized with autonomous aerial vehicle 210 (message m3).

Human operator 226 can then send a command to synchronize the modified local mission plan in computer system 206 with the mission plan in autonomous aerial vehicle 210 (message m4). In response to receiving a synchronize command from human operator 226, mission manager 208 can send the modified mission component to autonomous aerial vehicle 210 (message m5). In this example, the message with the modified mission component can be sent to autonomous aerial vehicle 210 over a wireless communications link.

In this example, vehicle manager 800 performs the consistency checks in response to receiving the modified mission component from mission manager 208 (step m6). The consistency check performed in step m6 is performed to determine whether the mission plan with the modified mission component can be executed in a manner that meets safety requirements.

When the consistency checks have been passed, vehicle manager 800 includes the modified mission component in the mission plan to form a new mission plan. This new mission plan is executed by autonomous aerial vehicle 210. In this illustrative example, the execution of the mission plan can be performed by vehicle manager 800.

If the consistency checks are passed, vehicle manager 800 returns a response to mission manager 208 indicating that the mission plan in autonomous aerial vehicle 210 with the modified mission component can be executed by autonomous aerial vehicle 210 (message m7). In this manner, mission manager 208 can include the modified mission component in the local mission plan. In this example, the response is sent to human operator 226 by mission manager 208 (message m8).

When human operator 226 receives the response from mission manager 208, human operator 226 can send an execute command to mission manager 208 to execute the new mission plan that has been synchronized to include the modified mission component (message m9). In response, mission manager 208 forwards the execute command to vehicle manager 800 (message m10).

In response to receiving the execute command, vehicle manager 800 replies with a command received response (message m11). The command received response in message m11 is received by mission manager 208. In turn, mission manager 208 relays command received response to human operator 226 (message m12).

If vehicle manager 800 does not receive the execute command, vehicle manager 800 does not execute the new mission plan containing the modified mission component. Instead, vehicle manager 800 continues to operate in autonomous aerial vehicle 210 by executing the mission plan without the modified mission components. If autonomous aerial vehicle 210 is on the ground, no action may be taken.

As a result, autonomous aerial vehicle 210 can operate even with communication outages. In this illustrative example, various actions such as a landing runway specified in the mission component in the mission plan may not have been approved at the time of execution when the communications outages are present. However, vehicle manager 800 can continue to operate autonomous aerial vehicle 210 using the specified landing runway even when a communications outage is present. Further, this mission plan is also known to mission manager 208 and human operator 226. As a result, it is predictable as to what actions autonomous aerial vehicle 210 will perform. The action includes landing at the specified runway that has not yet been approved. In this example, changes to other traffic can be made to ensure that the runway is available for landing by autonomous aerial vehicle 210.

Vehicle manager 800 executes the new mission plan (step m13). When the new mission plan is executed, vehicle manager 800 can send an execution notification to mission manager 208 that the execution of the mission plan has begun (message m14). In this example, the execution notification can be sent to human operator 226 by mission manager 208 (message m15).

With the multiple steps for synchronizing a local mission plan in computer system 206 with a mission plan in autonomous aerial vehicle 210, the steps with the different checks can prevent human operator 226 from unintentionally sending a wrong, inconsistent, or incomplete modified mission component or command to autonomous aerial vehicle 210. In this illustrative example, only a single unmanned aerial vehicle can be commanded at any one time. This type of implementation can prevent human operator 226 from sending a modified mission component or command to the wrong autonomous aerial vehicle.

Figure 9:
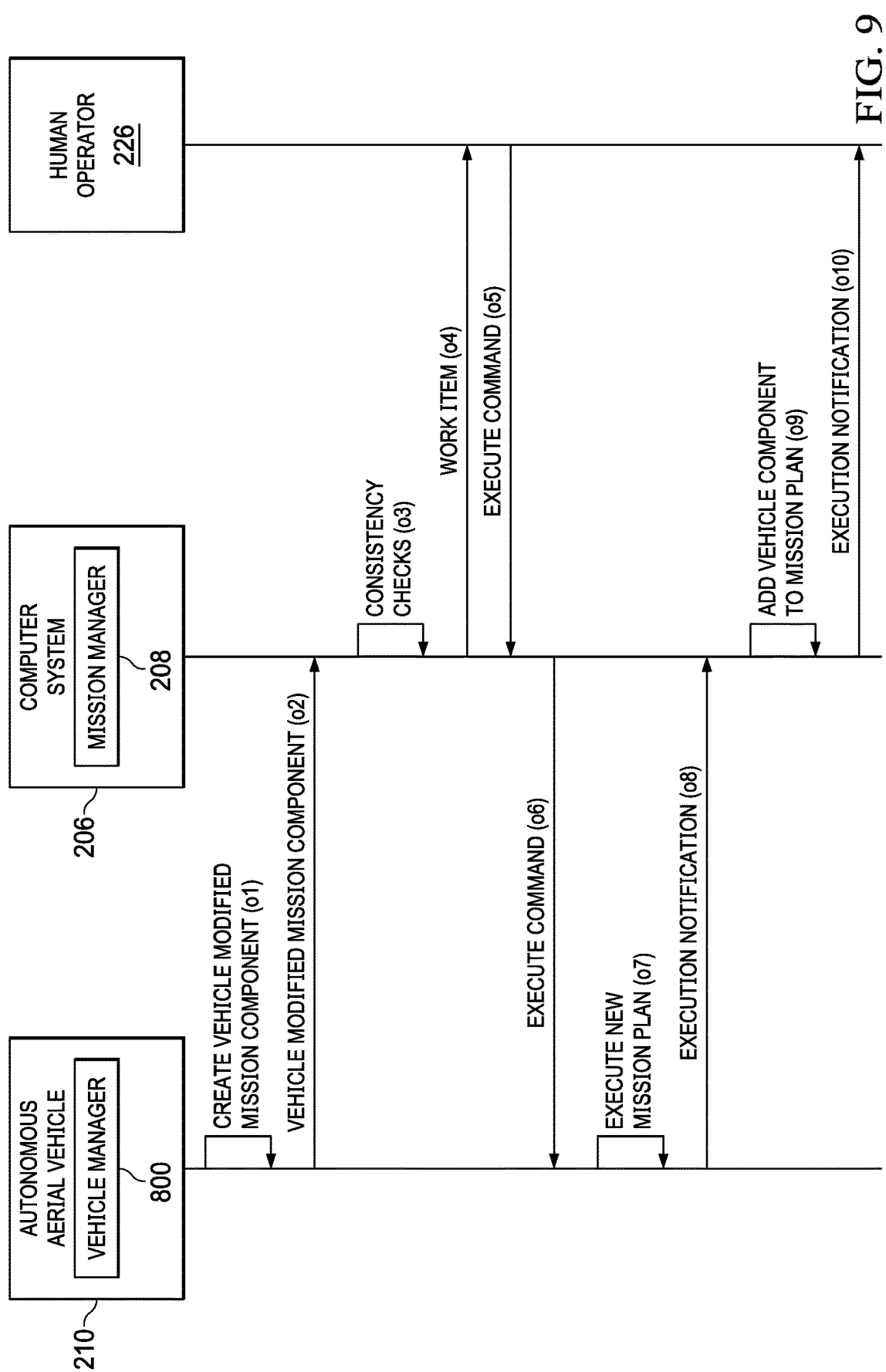
FIG. 9 is an illustration of a message flow diagram for modifying a mission plan for an autonomous aerial vehicle in accordance with an illustrative embodiment.

Turning to FIG. 9, an illustration of a message flow diagram for modifying a mission plan for an autonomous aerial vehicle is depicted in accordance with an illustrative embodiment. In this illustrative example, the message flow diagram includes a flow of messaging and steps that are used by vehicle manager 800 in autonomous aerial vehicle 210 to add a modified mission component to a mission plan.

In the illustrative example, the interactions between human operator 226 and computer system 206 in this message flow diagram use a human machine interface such as human machine interface 244 in FIG. 2. The exchange of messages between mission manager 208 and vehicle manager 800 are made using one or more wireless communications links.

In some illustrative examples, vehicle manager 800 can create modified mission components to modify mission plan during flight. In this depicted example, vehicle manager 800 in autonomous aerial vehicle 210 creates a modified mission component (step o1). For example, vehicle manager 800 may receive weather information or regular data indicating turbulence for bad weather. Vehicle manager 800 may modify a mission module to propose a change to avoid turbulence. For example, the modified mission module may change the altitude from 20,000 feet to 22,000 feet. As another example, with bad weather, vehicle manager 800 may modify a mission module that proposes a different route to avoid the bad weather.

In this example, vehicle manager 800 sends the modified mission component to mission manager 208 in computer system 206 (message o2). In this example, mission manager 208 can perform consistency checks upon receiving the modified mission component (step o3). The consistency checks are performed on the local mission model using the modified mission component received from vehicle manager 800 in autonomous aerial vehicle 210.

If the mission can be executed using the vehicle modified mission component, mission manager 208 sends a work item to human operator 226 requesting approval for the vehicle modified mission component (message o4). In message o4, the work item can be displayed in an operator work queue within a mission work queue displayed in a graphical user interface. The work item requests human operator 226 to approve or disapprove of the vehicle modified mission component for autonomous aerial vehicle 210. In this example, human operator 226 may make the decision or may request approval from another source such as an air traffic controller.

As depicted, human operator 226 can return an execute command to mission manager 208 when approving use of the vehicle modified mission component to modify the mission plan for autonomous aerial vehicle 210 (message o5). The execute command is sent by mission manager 208 to vehicle manager 800 (message o6).

In response to receiving the execute command, vehicle manager 800 executes the mission plan with the vehicle modified mission components (step o7). Additionally, vehicle manager 800 returns an execution notification to mission manager 208 (message o8).

In response to receiving the execution notification in message o8, mission manager 208 can add the vehicle modified mission component to the mission plan that is stored locally by mission manager 208 (step o9). Also, in response to receiving the execution notification in message o8, mission manager 208 sends the execution notification to human operator 226 (message o10).

The illustration of the message flows and steps in FIG. 8 and FIG. 9 are examples of one manner in which a modified mission component in a local mission plan can be synchronized with a mission plan in an autonomous aerial vehicle. This illustration is not meant to limit the manner in which other message flows and steps can be performed. For example, a received response in message m11 and message m12 or execution notification in message m14 and message m15 in FIG. 8 can be omitted in other illustrative examples.

As another example, additional steps can be performed in the message flow in FIG. 9 in which vehicle manager 800 can also perform consistency checks before sending the vehicle modified mission component to mission manager 208.

In another example, the human operator commands the autonomous aerial vehicle to initiate execution of the mission plan or mission component and another message is sent to the autonomous aerial vehicle. The autonomous aerial vehicle can respond with "message received". If this message is not received from the autonomous aerial vehicle within a timeout period of time, the human operator can be notified.

As another example, when the autonomous aerial vehicle starts execution of the new mission plan and notifies the human operator accordingly, this notification can also mean that the autonomous aerial vehicle continues with the next mission component in the original mission plan that needs an extra command to initiate. An extra command from the human operator may be required by government regulations. This extra command can be, for example, enter a hold pattern, leave a hold pattern, continue to line-up after a hold short, or other types of commands that may be required by government or other sources of rules or regulations.

In some cases, such "extra" manual command can be circumvented with allowing "automatic execution" when possible. This action is an option that can be selected by the human operator.

In case of lost communications while the autonomous aerial vehicle is in the air, the autonomous aerial vehicle can continue with executing the mission plan under the assumption that every step will be cleared and initiated by air traffic control and the human operator. In this situation, the air traffic control and the human operator are notified about the lost communications and can clear traffic. While the autonomous aerial vehicle is on the ground during a communication loss, the autonomous aerial vehicle can stop execution of the mission plan.

Figure 10:
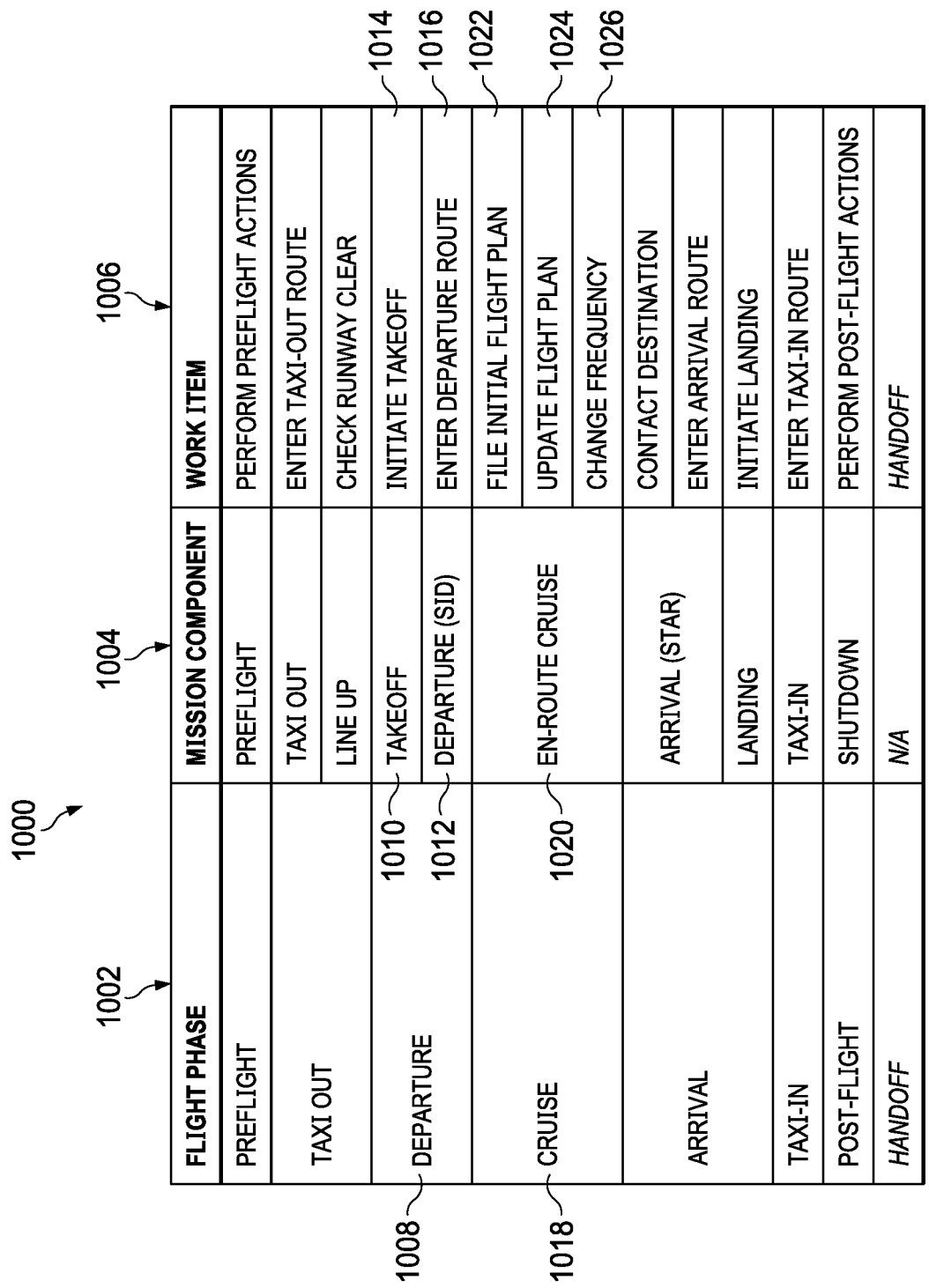
FIG. 10 is an illustration of mission components and work items in accordance with an illustrative embodiment.

With reference next to FIG. 10, an illustration of mission components and work items are depicted in accordance with an illustrative embodiment. In this illustrative example, table 1000 illustrates mission components and work items that may be performed for particular mission components in different phases of flight.

In this illustrative example, table 1000 comprises three columns: flight phase column 1002, mission component column 1004, and work item column 1006. A one-to-one relationship is not present between rows of entries in table 1000. A entry in a row in one column can be associated with one or more entries in the rows in another column.

For example, departure 1008 in flight phase column 1002 is associated with takeoff 1010 and departure (SID) 1012 in mission component column 1004. In this example, takeoff 1010 is associated with initiate takeoff 1014, and departure (SID) 1012 is associated with enter departure route 1016 in work item column 1006.

As another example, cruise 1018 in flight phase column 1002 is associated with en-route cruise 1020 in mission component column 1004. In this particular example, en-route cruise 1020 is associated with the following work items in work item column 1006: file initial flight plan 1022, update flight plan 1024, and change frequency 1026.

Thus, one or more illustrative examples overcome an issue with managing missions for multiple autonomous aerial vehicles. As a result, in one or more illustrative examples, a human operator can be assigned to missions for multiple autonomous aerial vehicles. In the illustrative example, one or more illustrative examples enable commanding an unmanned aerial vehicle in a manner that does not require continuous communications with an autonomous aerial vehicle as compared to current techniques. Further, one or more illustrative examples can reduce a workload for a human operator managing a mission for an autonomous aerial vehicle. One or more illustrative examples can provide a graphical user interface that displays information in a manner that reduces workload for a human operator as compared to current techniques of display instrumentation for autonomous aerial vehicles.

Computer system 206 in FIG. 2 and FIGS. 8-9 can be configured to perform at least one of the steps, operations, or actions described in the different illustrative examples using software, hardware, firmware, or a combination thereof. As a result, computer system 206 operates as a special purpose computer system in which mission manager 208 in FIG. 2 and FIGS. 8-9 in computer system 206 enables managing an autonomous aerial vehicle. In particular, mission manager 208 transforms computer system 206 into a special purpose computer system as compared to currently available general computer systems that do not have mission manager 208.

The illustration of autonomous aerial vehicle environment 200 and the different components in autonomous aerial vehicle environment 200 in FIGS. 2-10 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, change 230 can modify more than one mission component in some illustrative examples. For example, change 230 may be modified to one or more mission components in mission components 222. In other illustrative examples, change 230 may remove or delete a mission component from mission components 222. These and other types of changes can be made and communicated to autonomous aerial vehicle 210 to form a new mission plan for autonomous aerial vehicle 210.

Further, the illustrative examples can be implemented using autonomous aerial vehicles 204 having have various levels of autonomy. This process can be implemented for any flight phase or flight phases that can be performed by the autonomous aerial vehicles without user input.

For example, autonomous aircraft management system 202 can be used to manage a cruise portion of a flight phase of autonomous aerial vehicle 210. In another example, departure, cruise, and arrival portions of a mission may be managed and not the taxi-out or taxi-in portions of the mission. This reduced autonomy may be a result of at least one of a capability of autonomous aerial vehicle 210, a government regulation, a rule, or some other constraint on autonomous aerial vehicle 210 to perform a fully autonomous mission.

As another example, the different processes in mission manager 208 can be operated by the operator or owner of autonomous aerial vehicle 210. In some illustrative examples, mission manager 208 can be offered as a service to the operator or owner of autonomous aerial vehicle 210.

Figure 11:
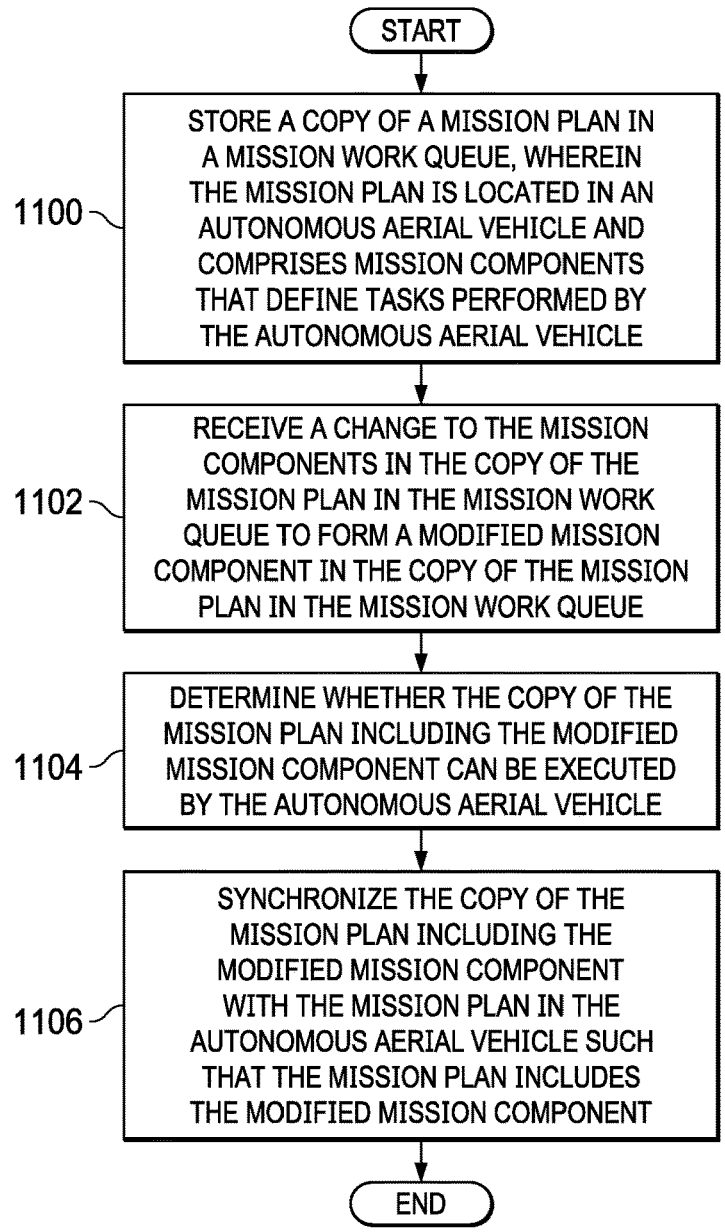
FIG. 11 is an illustration of a flowchart of a process for managing autonomous aerial vehicle in accordance with an illustrative embodiment.

Turning next to FIG. 11, an illustration of a flowchart of a process for managing an autonomous aerial vehicle is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in mission manager 208 in computer system 206 in FIG. 2.

The process begins by storing a copy of a mission plan in a mission work queue, wherein the mission plan is located in an autonomous aerial vehicle and comprises mission components that define tasks performed by the autonomous aerial vehicle (operation 1100). The process receives a change to the mission components in the copy of the mission plan in the mission work queue to form a modified mission component in the copy of the mission plan in the mission work queue (operation 1102).

The process determines whether the copy of the mission plan including the modified mission component can be executed by the autonomous aerial vehicle (operation 1104). The process synchronizes the copy of the mission plan including the modified mission component with the mission plan in the autonomous aerial vehicle such that the mission plan includes the modified mission component (operation 1106). The process terminates thereafter. The autonomous aerial vehicle executes the mission plan including the modified mission component.

Figure 12:
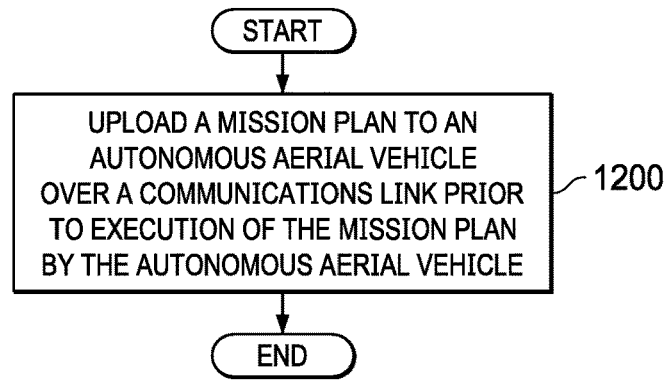
FIG. 12 is an illustration of a flowchart of a process for managing an autonomous aerial vehicle in accordance with an illustrative embodiment.

With reference to FIG. 12, an illustration of a flowchart of a process for managing an autonomous aerial vehicle is depicted in accordance with an illustrative embodiment. The flowchart in FIG. 12 depicts an operation that can be performed with the operations in FIG. 11.

The process uploads a mission plan to an autonomous aerial vehicle over a communications link prior to execution of the mission plan by the autonomous aerial vehicle (operation 1200). The process terminates thereafter.

Figure 13:
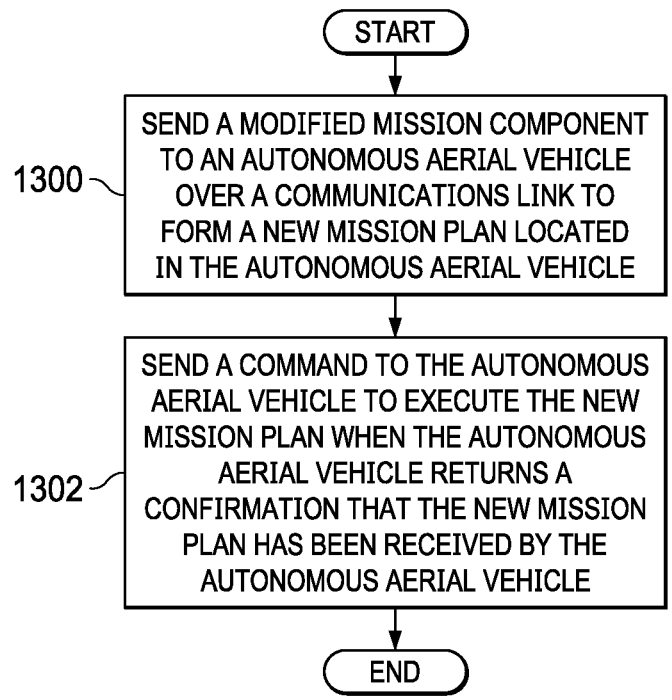
FIG. 13 is an illustration of a flowchart of a process for synchronizing a copy of a mission plan within a mission plan in an autonomous aerial vehicle in accordance with an illustrative embodiment.

Turning to FIG. 13, an illustration of a flowchart of a process for synchronizing a copy of a mission plan within a mission plan in an autonomous aerial vehicle is depicted in accordance with an illustrative embodiment. The process illustrated in this flowchart is an example of one implementation for operation 1106 in FIG. 11.

The process begins by sending a modified mission component to an autonomous aerial vehicle over a communications link to form a new mission plan located in the autonomous aerial vehicle (operation 1300). The process sends a command to the autonomous aerial vehicle to execute the new mission plan when the autonomous aerial vehicle returns a confirmation that the new mission plan has been received by the autonomous aerial vehicle (operation 1302). The process terminates thereafter.

Figure 14:
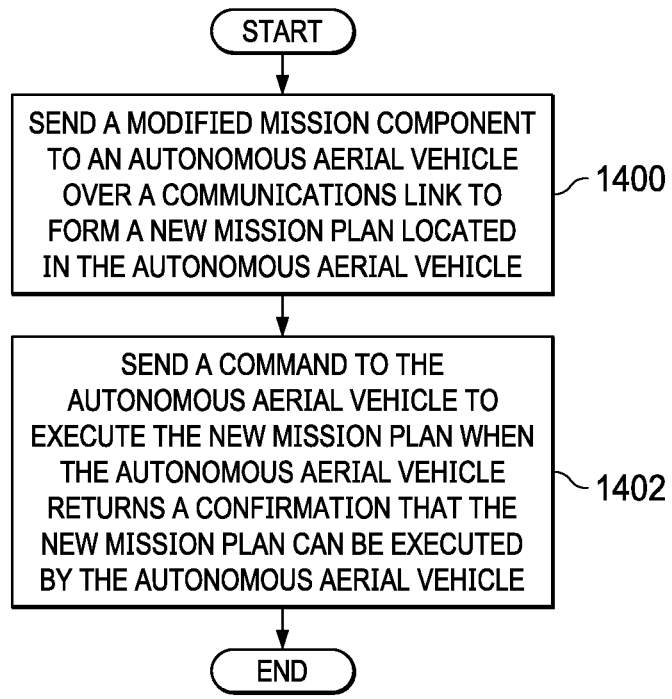
FIG. 14 is another illustration of a flowchart of a process for synchronizing a copy of a mission plan within a mission plan in an autonomous aerial vehicle in accordance with an illustrative embodiment.

With reference now to FIG. 14, an illustration of a flowchart of a process for synchronizing a copy of a mission plan within a mission plan in an autonomous aerial vehicle is depicted in accordance with an illustrative embodiment. The process illustrated in this flowchart is another example of an implementation for operation 1106 in FIG. 11.

The process begins by sending a modified mission component to an autonomous aerial vehicle over a communications link to form a new mission plan located in the autonomous aerial vehicle (operation 1400). The process sends a command to the autonomous aerial vehicle to execute the new mission plan when the autonomous aerial vehicle returns a confirmation that the new mission plan can be executed by the autonomous aerial vehicle (operation 1402). The process terminates thereafter.

Figure 15:
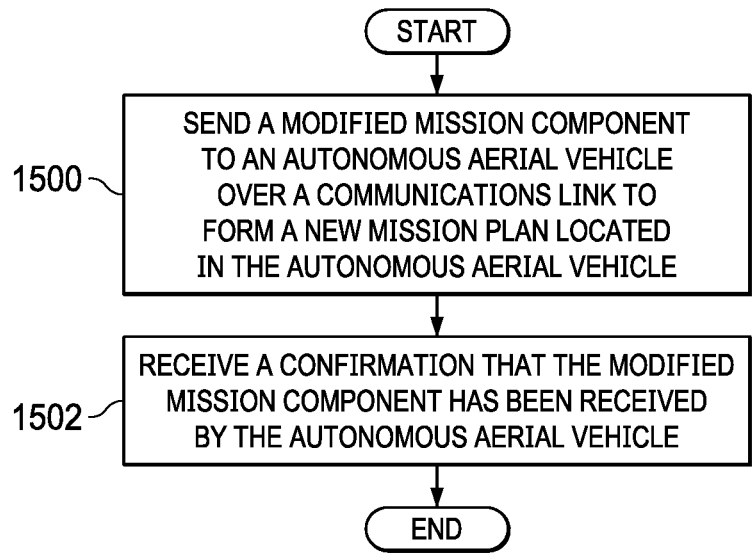
FIG. 15 is yet another illustration of a flowchart of a process for synchronizing a copy of a mission plan within a mission plan in an autonomous aerial vehicle in accordance with an illustrative embodiment.

Turning next to FIG. 15, an illustration of a flowchart of a process for synchronizing a copy of a mission plan within a mission plan in an autonomous aerial vehicle is depicted in accordance with an illustrative embodiment. The process illustrated in this flowchart is another example of an implementation for operation 1106 in FIG. 11.

The process begins by sending a modified mission component to an autonomous aerial vehicle over a communications link to form a new mission plan located in the autonomous aerial vehicle (operation 1500). The process receives a confirmation that the modified mission component has been received by the autonomous aerial vehicle (operation 1502). The process terminates thereafter.

Figure 16:
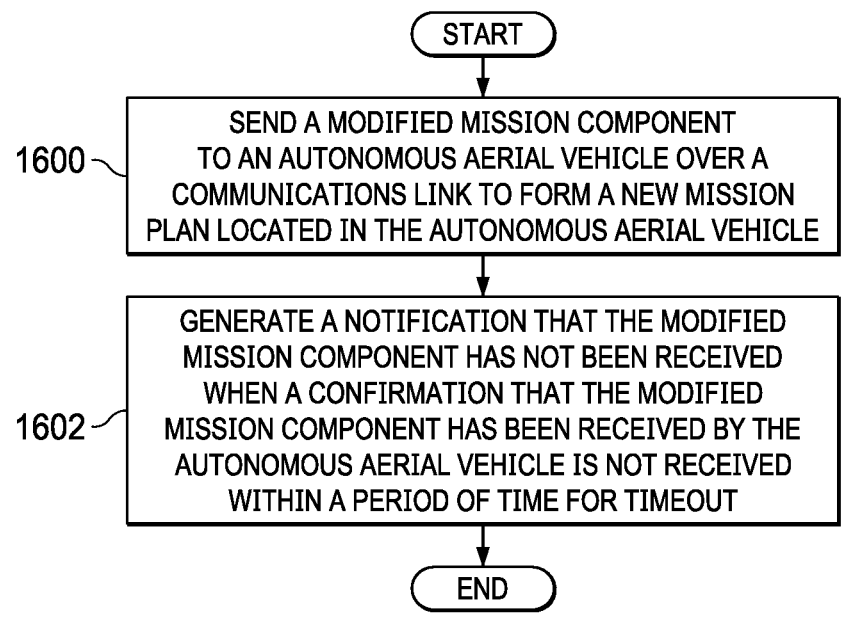
FIG. 16 is still another illustration of a flowchart of a process for synchronizing a copy of a mission plan within a mission plan in an autonomous aerial vehicle in accordance with an illustrative embodiment.

In FIG. 16, an illustration of a flowchart of a process for synchronizing a copy of a mission plan within a mission plan in an autonomous aerial vehicle is depicted in accordance with an illustrative embodiment. The process illustrated in this flowchart is yet another example of an implementation for operation 1106 in FIG. 11. This flowchart illustrates when a failure in synchronization occurs.

The process begins by sending a modified mission component to an autonomous aerial vehicle over a communications link to form a new mission plan located in the autonomous aerial vehicle (operation 1600). The process generates a notification that the modified mission component has not been received when a confirmation that the modified mission component has been received by the autonomous aerial vehicle is not received within a period of time for timeout (operation 1602). The process terminates thereafter.

Figure 17:
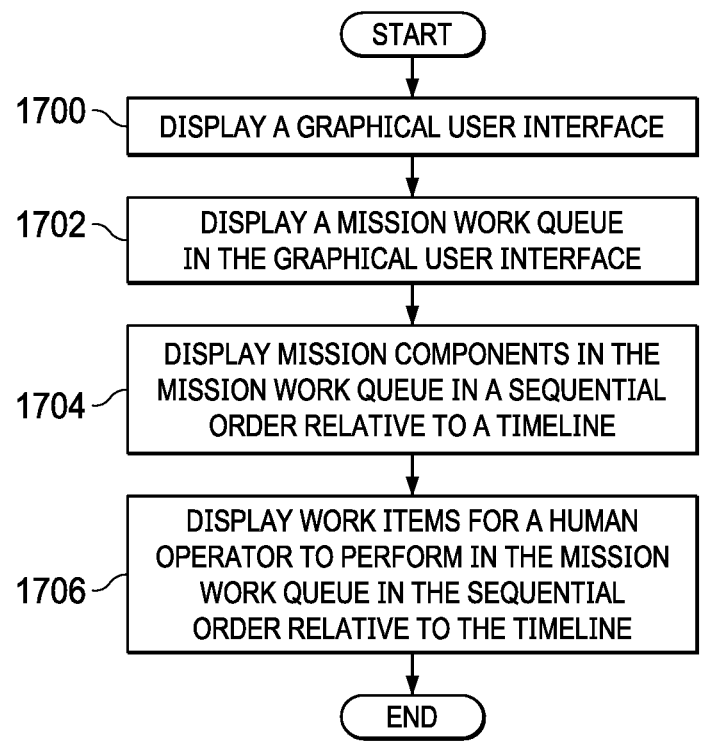
FIG. 17 is an illustration of a flowchart of a process for displaying a graphical user interface used in managing an autonomous aerial vehicle in accordance with an illustrative embodiment.

Turning to FIG. 17, an illustration of a flowchart of a process for displaying a graphical user interface used in managing an autonomous aerial vehicle is depicted in accordance with an illustrative embodiment. The process in FIG. 17 can be implemented in hardware, software, or both. When implemented in software, the process can take the form of program code that is run by one or more processor units located in one or more hardware devices in one or more computer systems. For example, the process can be implemented in mission manager 208 in computer system 206 to display graphical user interface 250 in display system 246 in human machine interface 244 in FIG. 2.

The process begins by displaying a graphical user interface (operation 1700). The process displays a mission work queue in the graphical user interface (operation 1702). The process displays mission components in the mission work queue in a sequential order relative to a timeline (operation 1704).

The process displays work items for a human operator to perform in the mission work queue in the sequential order relative to the timeline (operation 1706). The process terminates thereafter.

In operation 1704 and operation 1706, the mission components and the work items can be displayed using graphical indicators having a vertical size representing a duration and are aligned to the timeline based on a start time. Additionally, the mission components and the work items are displayed in parallel relative to the timeline.

Figure 18:
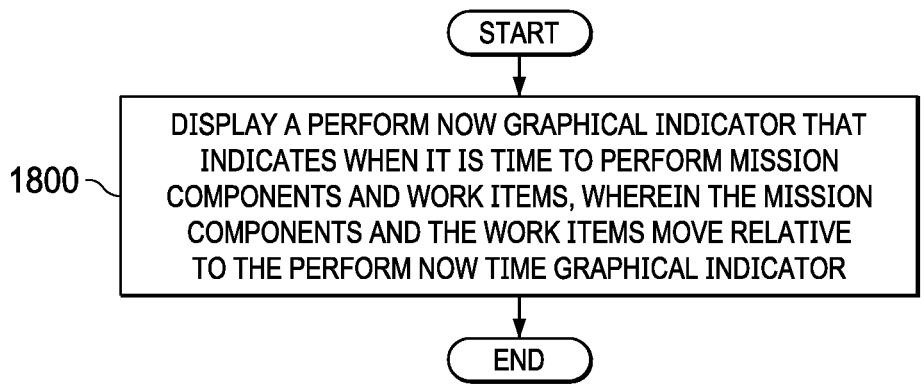
FIG. 18 is an illustration of a flowchart of a process for displaying a graphical user interface used in managing an autonomous aerial vehicle in accordance with an illustrative embodiment.

Turning to FIG. 18, an illustration of a flowchart of a process for displaying a graphical user interface used in managing an autonomous aerial vehicle is depicted in accordance with an illustrative embodiment. The process in this flowchart illustrates an additional operation that can be performed with the operations in the process depicted in the flowchart in FIG. 17.

The process displays a perform now graphical indicator that indicates when it is time to perform mission components and work items, wherein the mission components and the work items move relative to the perform now graphical indicator (operation 1800). The process terminates thereafter.

Figure 19:
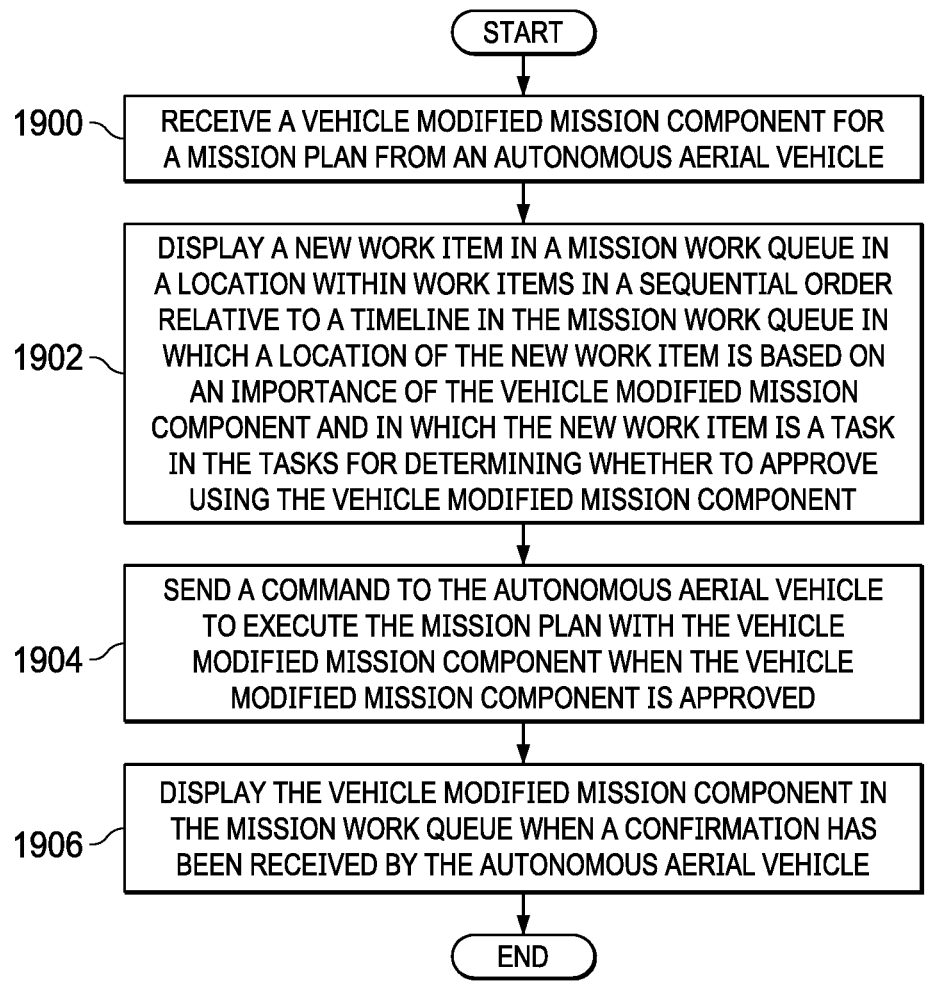
FIG. 19 is an illustration of a flowchart of a process for processing a vehicle modified mission component for a mission plan in accordance with an illustrative embodiment.

Turning to FIG. 19, an illustration of a flowchart of a process for processing a vehicle modified mission component for a mission plan is depicted in accordance with an illustrative embodiment. The process in FIG. 19 can be implemented in hardware, software, or both. When implemented in software, the process can take the form of program code that is run by one or more processor units located in one or more hardware devices in one or more computer systems. For example, the process can be implemented in mission manager 208 in computer system 206 in FIG. 2.

The process begins by receiving a vehicle modified mission component for a mission plan from an autonomous aerial vehicle (operation 1900). The process displays a new work item in a mission work queue in a location within work items in a sequential order relative to a timeline in the mission work queue in which a location of the new work item is based on an importance of the vehicle modified mission component and in which the new work item is a task in the tasks for determining whether to approve using the vehicle modified mission component (operation 1902). In operation 1902, the display can be made after consistency checks are performed and the results indicate that the mission plan can be executed with the vehicle modified mission component. In this example, these consistency checks can be made by one or both the vehicle manager and the mission manager.

The process sends a command to the autonomous aerial vehicle to execute the mission plan with the vehicle modified mission component when the vehicle modified mission component is approved (operation 1904). The process displays the vehicle modified mission component in the mission work queue when the confirmation has been received by the autonomous aerial vehicle (operation 1906). The process terminates thereafter.

Figure 20:
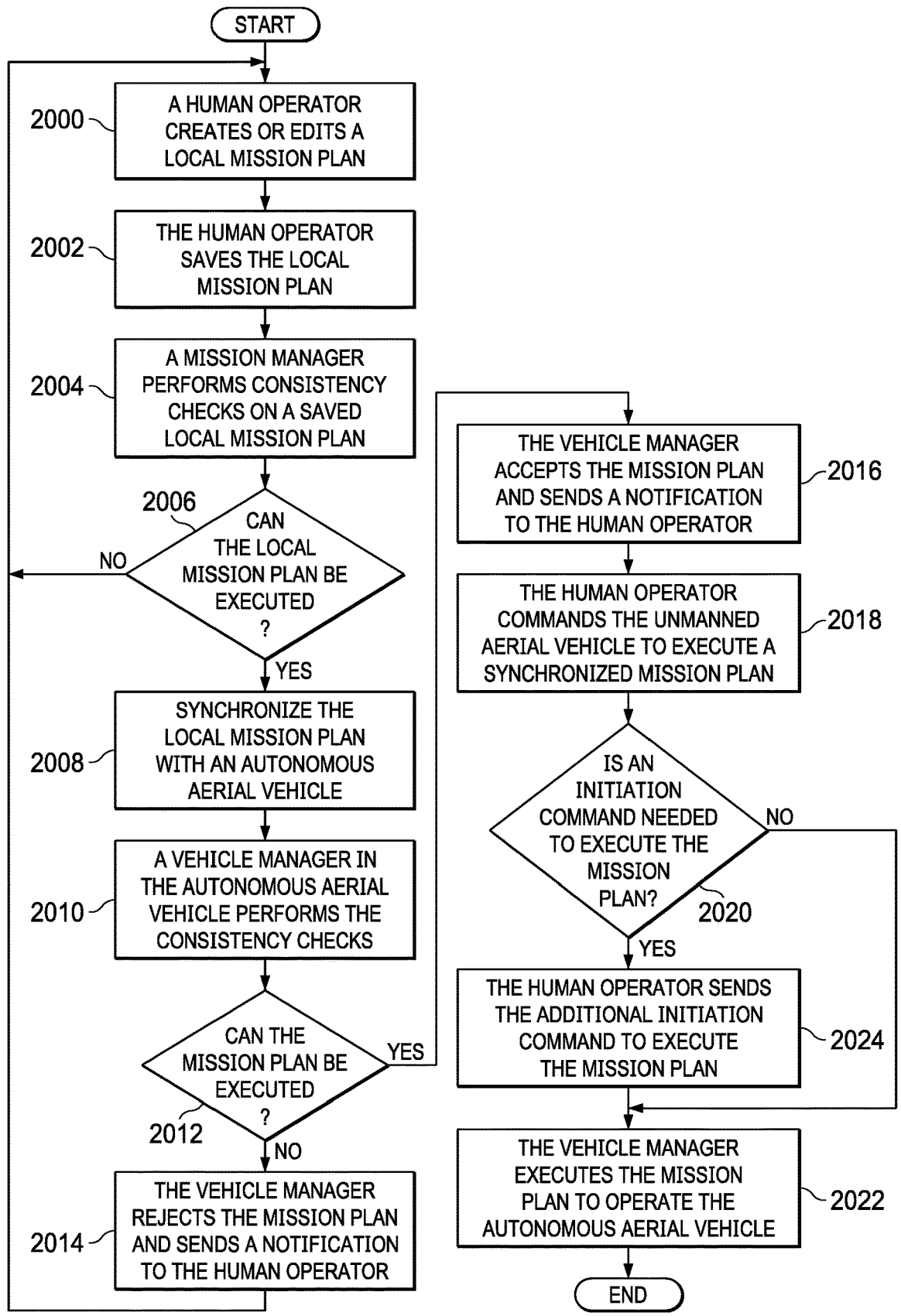
FIG. 20 is an illustration of a flowchart of a process for managing an autonomous aerial vehicle in accordance with an illustrative embodiment.

Turning next to FIG. 20, an illustration of a flowchart of a process for managing an autonomous aerial vehicle is depicted in accordance with an illustrative embodiment. The process in FIG. 20 can be implemented in hardware, software, or both. When implemented in software, the process can take the form of program code that is run by one or more processor units located in one or more hardware devices in one or more computer systems. For example, the process can be implemented in mission manager 208 in computer system 206 in FIG. 2 and vehicle manager 800 in autonomous aerial vehicle 210 in FIG. 8 and FIG. 9. In this example, the different operations performed by human operator 226 can occur through interactions between human operator 226 and mission manager 208 using human machine interface 244 in FIG. 2.

The process begins by a human operator creating or editing a local mission plan (operation 2000). The human operator saves the local mission plan (operation 2002).

A mission manager performs consistency checks on a saved local mission plan (operation 2004). A determination is made by the mission manager as to whether the local mission plan can be executed (operation 2006). If the local mission plan cannot be executed, the process returns to operation 2000 for the human operator to edit the local mission plan.

Otherwise, the process synchronizes the local mission plan with an autonomous aerial vehicle (operation 2008). In operation 2008, the synchronization is performed by the mission manager at a ground station and a vehicle manager in the autonomous aerial vehicle. The mission manager maintains a copy of the mission plan located in the autonomous aerial vehicle.

A vehicle manager in the autonomous aerial vehicle performs the consistency checks (operation 2010). The consistency checks in operation 2010 provide for increased safety in creating and updating mission plans for an autonomous aerial vehicle.

A determination is made by the vehicle manager as to whether the mission plan can be executed (operation 2012). If the mission plan cannot be executed, the vehicle manager rejects the mission plan and sends a notification to the human operator (operation 2014). For example, if a change was made to the destination airport and the approach no longer matches the destination airport, then a lack of consistency is present. In this case, the mission plan cannot be executed and is rejected. In this manner, the vehicle manager in the aircraft can make similar checks for consistency using its own data sources. The process then returns to operation 2000 to allow the human operator to make edits to the mission plan.

Otherwise, the vehicle manager accepts the mission plan and sends a notification to the human operator (operation 2016). The human operator commands the unmanned aerial vehicle to execute a synchronized mission plan (operation 2018). In operation 2018, the command is related to the unmanned aerial vehicle by the mission manager.

A determination is made as to whether an initiation command is needed to execute the mission plan (operation 2020). If an initiation command is not needed, the vehicle manager executes the mission plan to operate the autonomous aerial vehicle (operation 2022). The process terminates thereafter.

With reference again to operation 2020, if an additional initiation command is needed, the human operator sends the additional initiation command to execute the mission plan (operation 2024). The process then proceeds to operation 2022.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 21:
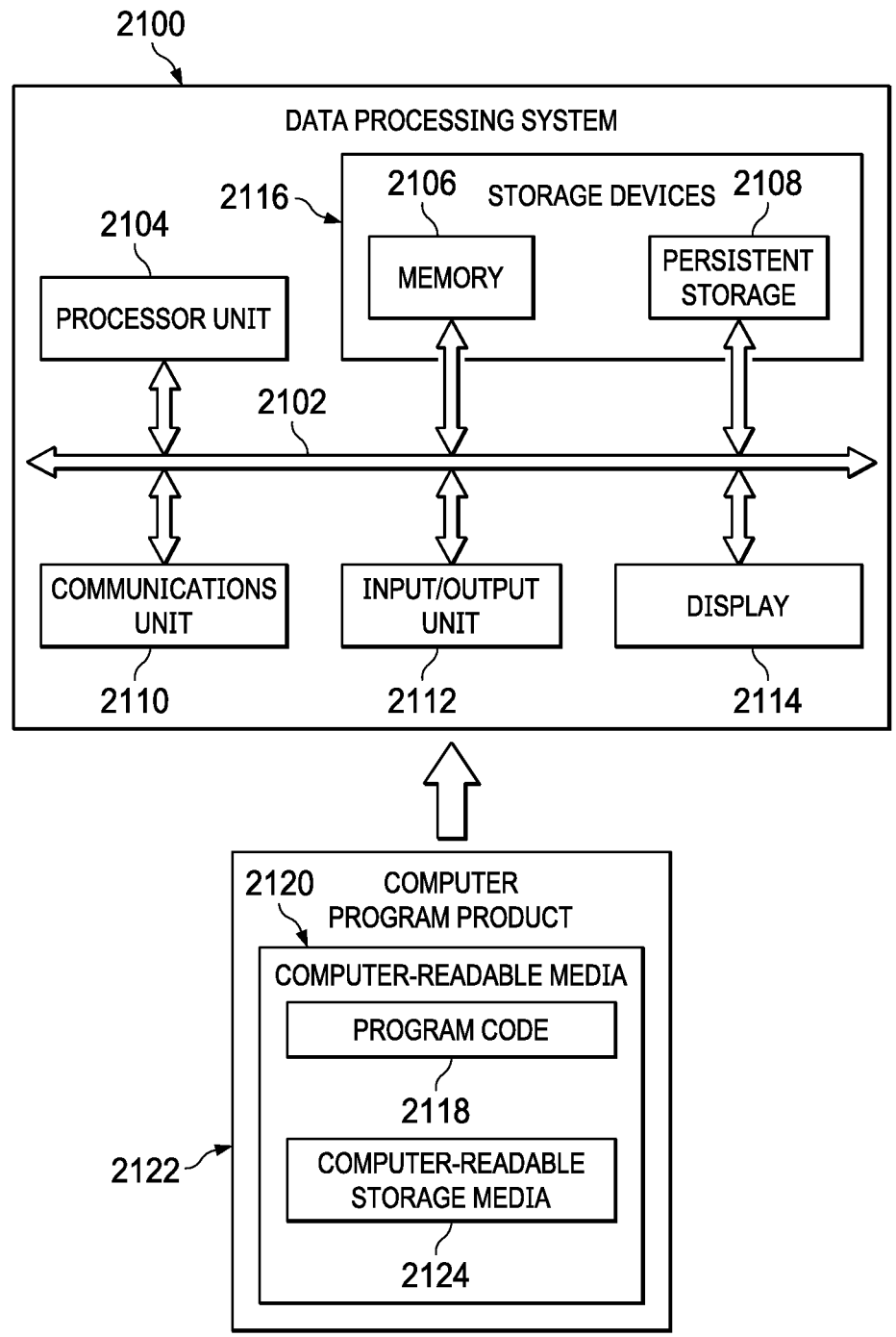
FIG. 21 is an illustration of a block diagram of a data processing system in accordance with an illustrative embodiment.

Turning now to FIG. 21, an illustration of a block diagram of a data processing system is depicted in accordance with an illustrative embodiment. Data processing system 2100 can be used to implement server computer 104, server computer 106, and client devices 110 in FIG. 1. Data processing system 2100 can also be used to implement computer system 206 and autonomous aerial vehicles 204 in FIG. 2. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 takes the form of a bus system.

Processor unit 2104 serves to execute instructions for software that can be loaded into memory 2106. Processor unit 2104 includes one or more processors. For example, processor unit 2104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2104 can may be implemented using one or more heterogeneous processor systems in which a main processor is present with secondary processors on a single chip. As another illustrative example, processor unit 2104 can be a symmetric multi-processor system containing multiple processors of the same type on a single chip.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, can be, for example, a random-access memory or any other suitable volatile or non-volatile storage device. Persistent storage 2108 can take various forms, depending on the particular implementation.

For example, persistent storage 2108 may contain one or more components or devices. For example, persistent storage 2108 can be a hard drive, a solid-state drive (SSD), a flash memory, a rewritable optical disk, a rewritable magnetic tape, or some combination of the above. The media used by persistent storage 2108 also can be removable. For example, a removable hard drive can be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that can be connected to data processing system 2100. For example, input/output unit 2112 can provide a connection for user input through at least one of a keyboard, a mouse, or some other suitable input device. Further, input/output unit 2112 can send output to a printer. Display 2114 provides a mechanism to display information to a user.

Instructions for at least one of the operating system, applications, or programs can be located in storage devices 2116, which are in communication with processor unit 2104 through communications framework 2102. The processes of the different embodiments can be performed by processor unit 2104 using computer-implemented instructions, which can be located in a memory, such as memory 2106.

These instructions are referred to as program code, computer usable program code, or computer-readable program code that can be read and executed by a processor in processor unit 2104. The program code in the different embodiments can be embodied on different physical or computer-readable storage media, such as memory 2106 or persistent storage 2108.

Program code 2118 is located in a functional form on computer-readable media 2120 that is selectively removable and can be loaded onto or transferred to data processing system 2100 for execution by processor unit 2104. Program code 2118 and computer-readable media 2120 form computer program product 2122 in these illustrative examples. In the illustrative example, computer-readable media 2120 is computer-readable storage media 2124.

In these illustrative examples, computer-readable storage media 2124 is a physical or tangible storage device used to store program code 2118 rather than a media that propagates or transmits program code 2118. Computer-readable storage media 2124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2118 can be transferred to data processing system 2100 using a computer-readable signal media. The computer-readable signal media can be, for example, a propagated data signal containing program code 2118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2120" can be singular or plural. For example, program code 2118 can be located in computer-readable media 2120 in the form of a single storage device or system. In another example, program code 2118 can be located in computer-readable media 2120 that is distributed in multiple data processing systems. In other words, some instructions in program code 2118 can be located in one data processing system while other instructions in program code 2118 can be located in one data processing system. For example, a portion of program code 2118 can be located in computer-readable media 2120 in a server computer while another portion of program code 2118 can be located in computer-readable media 2120 located in a set of client computers.

The different components illustrated for data processing system 2100 are not meant to provide architectural limitations to the manner in which different embodiments can be implemented. In some illustrative examples, one or more of the components may be incorporated in or otherwise form a portion of, another component. For example, memory 2106, or portions thereof, can be incorporated in processor unit 2104 in some illustrative examples. The different illustrative embodiments can be implemented in a data processing system including components in addition to or in place of those illustrated for data processing system 2100. Other components shown in FIG. 21 can be varied from the illustrative examples shown. The different embodiments can be implemented using any hardware device or system capable of running program code 2118.

Figure 22:
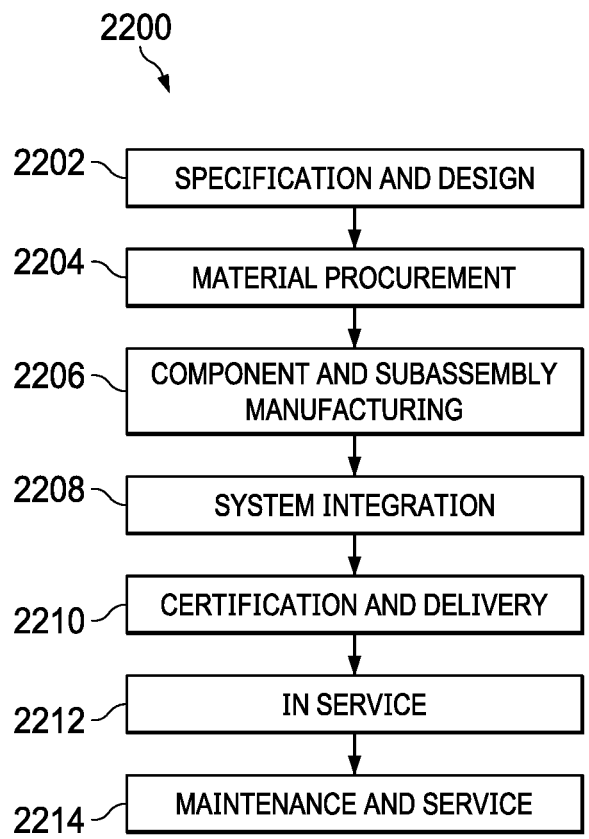
FIG. 22 is an illustration of an aircraft manufacturing and service method in accordance with an illustrative embodiment.
Figure 23:
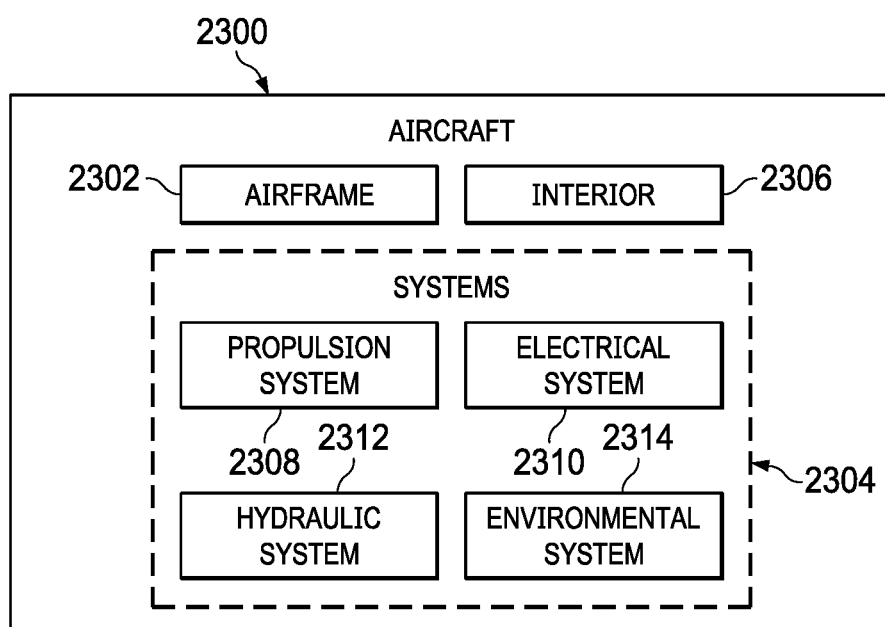
FIG. 23 is an illustration of a block diagram of an aircraft in which an illustrative embodiment may be implemented.

Illustrative embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 can go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in which an illustrative embodiment may be implemented. In this example, aircraft 2300 is an autonomous aerial vehicle produced an by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200 in FIG. 22.

In one illustrative example, components or subassemblies produced in component and subassembly manufacturing 2206 in FIG. 22 can be fabricated or manufactured in a manner similar to components or subassemblies produced while aircraft 2300 is in service 2212 in FIG. 22. As yet another example, one or more apparatus embodiments, method embodiments, or a combination thereof can be utilized during production stages, such as component and subassembly manufacturing 2206 and system integration 2208 in FIG. 22. One or more apparatus embodiments, method embodiments, or a combination thereof may be utilized while aircraft 2300 is in service 2212, during maintenance and service 2214 in FIG. 22, or both. The use of a number of the different illustrative embodiments may substantially expedite the assembly of aircraft 2300, reduce the cost of aircraft 2300, or both expedite the assembly of aircraft 2300 and reduce the cost of aircraft 2300.

For example, software and hardware components in aircraft 2300 can be implemented during at least one of system integration 2208 or maintenance and service 2214. These components can be used during in service 2212 of aircraft 2300 to enable human operators at ground stations to decrease workloads. This decrease in workload can also increase the number of autonomous aerial vehicles that can be managed by one or more human operators.

Thus, the illustrative embodiments provide a method, apparatus, system, and computer program product for managing an autonomous aerial vehicle. In one illustrative example, a method manages an autonomous aerial vehicle. A copy of a mission plan is stored by a computer system in a mission work queue. The mission plan is located in the autonomous aerial vehicle and comprises mission components that define tasks performed by the autonomous aerial vehicle. A change to the mission components in the copy of the mission plan in the mission work queue can be received by the computer system to form a modified mission component in the copy of the mission plan in the mission work queue. The computer system can determine that the copy of the mission plan including the modified mission component can be executed by the autonomous aerial vehicle. The copy of the mission plan including the modified mission component can be synchronized by the computer system with the mission plan in the autonomous aerial vehicle such that the mission plan includes the modified mission component. The autonomous aerial vehicle can execute the mission plan including the modified mission component.

One or more illustrative examples overcome an issue with managing missions for multiple autonomous aerial vehicles. As a result, in one or more illustrative examples, a human operator can manage missions for multiple autonomous aerial vehicles. In the illustrative example, one or more illustrative examples enable commanding an unmanned aerial vehicle in a manner that does not require continuous communications with an autonomous aerial vehicle as compared to current techniques. Further, one or more illustrative examples can reduce a workload for a human operator managing a mission for an autonomous aerial vehicle. One or more illustrative examples can provide a graphical user interface that displays information in a manner that reduces a workload for a human operator as compared to current techniques of display instrumentation for autonomous aerial vehicles.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An autonomous aircraft management system comprising:
   a computer system;
   a mission manager in the computer system, wherein the mission manager is configured to:
      store a copy of a mission plan in a mission work queue, wherein the mission plan is located in an autonomous aerial vehicle and comprises mission components that define tasks performed by the autonomous aerial vehicle;
      receive a change to the mission components in the copy of the mission plan in the mission work queue to form a modified mission component in the copy of the mission plan in the mission work queue;
      determine that the copy of the mission plan including the modified mission component can be executed by the autonomous aerial vehicle; and
      synchronize the copy of the mission plan including the modified mission component with the mission plan in the autonomous aerial vehicle such that the mission plan includes the modified mission component; and
   a human machine interface configured to:
      display a graphical user interface;
      display the mission work queue in the graphical user interface;
      display the mission components in the mission work queue in a sequential order relative to a timeline; and
      display work items for a human operator to perform in the mission work queue in the sequential order relative to the timeline,
   wherein the mission manager is configured to:
      receive a vehicle modified mission component for the mission plan from the autonomous aerial vehicle;
      display a new work item in the mission work queue in a location within the work items in the sequential order relative to the timeline in the mission work queue in which the location of the new work item is based on an importance of the vehicle modified mission component and in which the new work item is a task in the tasks for determining whether to approve using the vehicle modified mission component;
      send a confirmation to the autonomous aerial vehicle to execute the mission plan with the vehicle modified mission component when the vehicle modified mission component is approved; and
      display the vehicle modified mission component in the mission work queue when the confirmation has been received by the autonomous aerial vehicle.

2. The autonomous aircraft management system of claim 1, wherein the mission manager is configured to:
   upload the mission plan to the autonomous aerial vehicle over a communications link prior to execution of the mission plan by the autonomous aerial vehicle.

3. The autonomous aircraft management system of claim 1, wherein in synchronizing the copy of the mission plan including the modified mission component with the mission plan in the autonomous aerial vehicle, the mission manager is configured to:

send the modified mission component to the autonomous aerial vehicle over a communications link to form a new mission plan located in the autonomous aerial vehicle; and send a command to the autonomous aerial vehicle to execute the new mission plan when the autonomous aerial vehicle returns a confirmation that the modified mission component has been received by the autonomous aerial vehicle.

4. The autonomous aircraft management system of claim 1, wherein in synchronizing the copy of the mission plan including the modified mission component with the mission plan in the autonomous aerial vehicle, the mission manager is configured to:

send the modified mission component to the autonomous aerial vehicle over a communications link to form a new mission plan located in the autonomous aerial vehicle; and send a command to the autonomous aerial vehicle to execute the new mission plan when the autonomous aerial vehicle returns a confirmation that the new mission plan can be executed by the autonomous aerial vehicle.

5. The autonomous aircraft management system of claim 1, wherein in synchronizing the copy of the mission plan including the modified mission component with the mission plan in the autonomous aerial vehicle, the mission manager is configured to:

send the modified mission component to the autonomous aerial vehicle over a communications link to form a new mission plan located in the autonomous aerial vehicle; and receive a confirmation that the modified mission component has been received by the autonomous aerial vehicle.

6. The autonomous aircraft management system of claim 1, wherein in synchronizing the copy of the mission plan including the modified mission component with the mission plan in the autonomous aerial vehicle, the mission manager is configured to:

send the modified mission component to the autonomous aerial vehicle over a communications link to form a new mission plan located in the autonomous aerial vehicle; and generate a notification that the modified mission component has not been received when a confirmation that the modified mission component has been received by the autonomous aerial vehicle is not received within a period of time for a timeout.

7. The autonomous aircraft management system of claim 1, wherein in determining that the copy of the mission plan including the modified mission component can be executed by the autonomous aerial vehicle, the mission manager is configured to:

perform consistency checks on the mission plan including the modified mission component to determine whether the copy of the mission plan including the modified mission component can be executed by the autonomous aerial vehicle; and wherein the mission manager is configured to:
indicate an error when the copy of the mission plan including the modified mission component cannot be executed by the autonomous aerial vehicle.

8. The autonomous aircraft management system of claim 1, wherein the mission components and the work items are displayed in parallel relative to the timeline.

9. The autonomous aircraft management system of claim 1, wherein the work items and the mission components are displayed using graphical indicators having a vertical size representing a duration and are aligned to the timeline based on a start time.

10. The autonomous aircraft management system of claim 1, wherein the human machine interface is configured to:
display a perform now graphical indicator that indicates when it is time to perform the mission components and the work items, wherein the mission components and the work items move relative to the perform now graphical indicator.

11. The autonomous aircraft management system of claim 1, wherein the change to the mission components in the copy of the mission plan in the mission work queue is received as a user input from a human operator performing a work item to manage the autonomous aerial vehicle.

12. The autonomous aircraft management system of claim 1, wherein the work items are selected from at least one of perform a preflight checklist, enter a taxi-out route, check runway clear, initiate a takeoff, enter a departure route, file an initial flight plan, update a flight plan, change a frequency, contact a destination, enter an arrival route, initiate a landing, enter a taxi-in route, or perform a post-flight checklist.

13. The autonomous aircraft management system of claim 1, wherein the mission components are selected from at least one of a preflight, a taxi-out, a line up, a takeoff, a departure, an en-route cruise, an arrival, a landing, a taxi-in, or a shutdown.

14. The autonomous aircraft management system of claim 1, wherein receiving the change to the mission components in the copy of the mission plan in the mission work queue to form the modified mission component occurs during flight.

15. An autonomous aerial vehicle system comprising:
a computer system located in an autonomous aerial vehicle;
a vehicle manager in the computer system, wherein the vehicle manager is configured to:
execute a mission plan for the autonomous aerial vehicle, wherein the mission plan is located in the autonomous aerial vehicle and comprises mission components;
receive a modified mission component over a communications link to synchronize the mission plan with a copy of the mission plan in a mission work queue of an autonomous aircraft management system separate from the autonomous aerial vehicle that includes the modified mission component such that the mission plan includes the modified mission component;
determine that the modified mission component can be executed in a new mission plan that includes the mission components and the modified mission component;
synchronize the copy of the mission plan including the modified mission component with the mission plan in the autonomous aerial vehicle such that the mission plan includes the modified mission component; and
execute the new mission plan; and
a human machine interface configured to:
display a graphical user interface;
display the mission work queue in the graphical user interface;
display the mission components in the mission work queue in a sequential order relative to a timeline;

display work items for a human operator to perform in the mission work queue in the sequential order relative to the timeline;

receive a vehicle modified mission component for the mission plan from the autonomous aerial vehicle;

display a new work item in the mission work queue in a location within the work items in the sequential order relative to the timeline in the mission work queue in which the location of the new work item is based on an importance of the vehicle modified mission component and in which the new work item is a task in the tasks for determining whether to approve using the vehicle modified mission component;

send a confirmation to the autonomous aerial vehicle to execute the mission plan with the vehicle modified mission component when the vehicle modified mission component is approved; and display the vehicle modified mission component in the mission work queue when the confirmation has been received by the autonomous aerial vehicle.

16. The autonomous aerial vehicle system of claim 15, wherein the vehicle manager is configured to:
continue to execute the mission plan with the mission components when the modified mission component cannot be executed in the new mission plan.

17. The autonomous aerial vehicle system of claim 15, wherein in executing the new mission plan, the vehicle manager is configured to:
receive a command to execute the new mission plan; and
execute the new mission plan when the command is received.

18. The autonomous aerial vehicle system of claim 15, wherein the vehicle manager is configured to:
generate a vehicle modified mission component that can be executed with the mission components in the mission plan when an event occurs;
send the vehicle modified mission component to a ground station; and
modify the mission plan to include the vehicle modified mission component when a response approving the vehicle modified mission component is received from the ground station to form the new mission plan, wherein the autonomous aerial vehicle executes the new mission plan.

19. The autonomous aerial vehicle system of claim 18, wherein the event is one of turbulence, adverse weather conditions along a flight path, a lightning strike, a restricted airspace change, and a change in wind direction.

20. The autonomous aerial vehicle system of claim 15, wherein the computer system is selected from at least one of an autopilot, an autonomous flight controller, or an autonomous flight management system.

21. A method for managing an autonomous aerial vehicle, the method comprising:
storing, by a computer system, a copy of a mission plan in a mission work queue, wherein the mission plan is located in the autonomous aerial vehicle and comprises mission components that define tasks performed by the autonomous aerial vehicle;
receiving, by the computer system, a change to the mission components in the copy of the mission plan in the mission work queue to form a modified mission component in the copy of the mission plan in the mission work queue;

determining, by the computer system, that the copy of the mission plan including the modified mission component can be executed by the autonomous aerial vehicle;

synchronizing, by the computer system, the copy of the mission plan including the modified mission component with the mission plan in the autonomous aerial vehicle such that the mission plan includes the modified mission component, wherein the autonomous aerial vehicle executes the mission plan including the modified mission component;

displaying, by the computer system, a graphical user interface;

displaying, by the computer system, the mission work queue in the graphical user interface;

displaying, by the computer system, the mission components in the mission work queue in a sequential order relative to a timeline;

displaying, by the computer system, work items for a human operator to perform in the mission work queue the sequential order relative to the timeline;

receiving, by the computer system, a vehicle modified mission component for the mission plan from the autonomous aerial vehicle;

displaying, by the computer system, a new work item in the mission work queue in a location within the work items in the sequential order relative to the timeline in the mission work queue in which the location of the new work item is based on an importance of the vehicle modified mission component and in which the new work item is a task in the tasks for determining whether to approve using the vehicle modified mission component;

sending, by the computer system, a command to the autonomous aerial vehicle to execute the mission plan with the vehicle modified mission component when the vehicle modified mission component is approved; and displaying, by the computer system, the vehicle modified mission component in the mission work queue when a confirmation has been received by the autonomous aerial vehicle.

22. The method of claim 21 further comprising:
uploading, by the computer system, the mission plan to the autonomous aerial vehicle over a communications link prior to execution of the mission plan by the autonomous aerial vehicle.

23. The method of claim 21, wherein synchronizing, by the computer system, the copy of the mission plan including the modified mission component with the mission plan in the autonomous aerial vehicle comprises:
sending, by the computer system, the modified mission component to the autonomous aerial vehicle over a communications link to form a new mission plan located in the autonomous aerial vehicle; and
sending, by the computer system, a command to the autonomous aerial vehicle to execute the new mission plan when the autonomous aerial vehicle returns a confirmation that the modified mission component has been received by the autonomous aerial vehicle.

24. The method of claim 21, wherein synchronizing the copy of the mission plan including the modified mission component with the mission plan in the autonomous aerial vehicle comprises:
sending, by the computer system, the modified mission component to the autonomous aerial vehicle over a communications link to form a new mission plan located in the autonomous aerial vehicle; and sending, by the computer system, a command to the autonomous aerial vehicle to execute the new mission plan when the autonomous aerial vehicle returns a confirmation that the new mission plan can be executed by the autonomous aerial vehicle.

25. The method of claim 21, wherein synchronizing the copy of the mission plan including the modified mission component with the mission plan in the autonomous aerial vehicle comprises:
sending, by the computer system, the modified mission component to the autonomous aerial vehicle over a communications link to form a new mission plan located in the autonomous aerial vehicle; and
receiving, by the computer system, a confirmation that the modified mission component has been received by the autonomous aerial vehicle.

26. The method of claim 21, wherein synchronizing the copy of the mission plan including the modified mission component with the mission plan in the autonomous aerial vehicle comprises:
sending, by the computer system, the modified mission component to the autonomous aerial vehicle over a communications link to form a new mission plan located in the autonomous aerial vehicle; and
generating, by the computer system, a notification that the modified mission component has not been received when a confirmation that the modified mission component has been received by the autonomous aerial vehicle is not received within a period of time for timeout.

27. The method of claim 21 further comprising:
indicating, by the computer system, an error when the copy of the mission plan including the modified mission component cannot be executed by the autonomous aerial vehicle.

28. The method of claim 21, wherein the mission components and the work items are displayed in parallel relative to the timeline.

29. The method of claim 21, wherein the mission components and the work items are displayed using graphical indicators having a vertical size representing a duration and are aligned to the timeline based on a start time.

30. The method of claim 21 further comprising:
displaying, by the computer system, a perform now graphical indicator that indicates when it is time to perform the mission components and the work items, wherein the mission components and the work items move relative to the perform now graphical indicator.

31. The method of claim 21, wherein the change to the mission components in the copy of the mission plan in the mission work queue is received as a user input from a human operator performing a work item to manage the autonomous aerial vehicle.

32. The method of claim 21, wherein the work items are selected from at least one of perform a preflight checklist, enter a taxi-out route, check runway clear, initiate a takeoff, enter a departure route, file an initial flight plan, update a flight plan, change a frequency, contact a destination, enter an arrival route, initiate a landing, enter a taxi-in route, or perform a post-flight checklist.

33. The method of claim 21, wherein the mission components are selected from at least one of a preflight, a taxi-out, a line up, a takeoff, a departure, an en-route cruise, an arrival, a landing, a taxi-in, or a shutdown.

34. The method for managing an autonomous aerial vehicle of claim 21, wherein receiving the change to the mission components in the copy of the mission plan in the mission work queue to form a modified mission component occurs during flight.

35. A computer program product for managing an autonomous aerial vehicle, the computer program product comprising:
a computer-readable storage media;
first program code, stored on the computer-readable storage media, executable by a computer system to cause the computer system to store a copy of a mission plan in a mission work queue, wherein the mission plan is located in an autonomous aerial vehicle and comprises mission components that define tasks performed by the autonomous aerial vehicle;
second program code, stored on the computer-readable storage media, executable by the computer system to cause the computer system to receive a change to the mission components in the copy of the mission plan in the mission work queue to form a modified mission component in the copy of the mission plan in the mission work queue;
third program code, stored on the computer-readable storage media, executable by the computer system to cause the computer system to determine that the copy of the mission plan including the modified mission component can be executed by the autonomous aerial vehicle;
fourth program code, stored on the computer-readable storage media, executable by the computer system to cause the computer system to synchronize the copy of the mission plan including the modified mission component with the mission plan in the autonomous aerial vehicle such that the mission plan includes the modified mission component, wherein the autonomous aerial vehicle executes the mission plan including the modified mission component;
fifth program code, stored on the computer-readable storage media, executable by the computer system to cause a human machine interface to:
display a graphical user interface;
display the mission work queue in the graphical user interface;
display the mission components in the mission work queue in a sequential order relative to a timeline; and
display work items for a human operator to perform in the mission work queue in the sequential order relative to the timeline;
sixth program code, stored on the computer-readable storage media, executable by the computer system to cause a human interface to:
receive a vehicle modified mission component for the mission plan from the autonomous aerial vehicle;
display a new work item in the mission work queue in a location within the work items in the sequential order relative to the timeline in the mission work queue in which the location of the new work item is based on an importance of the vehicle modified mission component and in which the new work item is a task in the tasks for determining whether to approve using the vehicle modified mission component;
send a confirmation to the autonomous aerial vehicle to execute the mission plan with the vehicle modified mission component when the vehicle modified mission component is approved; and
display the vehicle modified mission component in the mission work queue when the confirmation has been received by the autonomous aerial vehicle.

36. The computer program product of claim 35, wherein change to the mission components in the copy of the mission plan in the mission work queue to form a modified mission component is received during flight.

\* \* \* \* \*